United States Patent [19]

Aoki et al.

[11] Patent Number: 4,651,593
[45] Date of Patent: Mar. 24, 1987

[54] CONTROL SYSTEM FOR A DIRECT-COUPLING MECHANISM IN HYDRAULIC POWER TRANSMISSION MEANS OF A TRANSMISSION FOR AUTOMOTIVE VEHICLES

[75] Inventors: Takashi Aoki, Fujimi; Junichi Miyake, Saitama; Masao Nishikawa, Tokyo, all of Japan

[73] Assignee: Honda Giken Kogyo K.K., Tokyo, Japan

[21] Appl. No.: 669,817

[22] Filed: Nov. 8, 1984

[30] Foreign Application Priority Data

| | | | |
|---|---|---|---|
| Nov. 8, 1983 | [JP] | Japan | 58-209711 |
| Feb. 14, 1984 | [JP] | Japan | 59-26238 |
| Feb. 14, 1984 | [JP] | Japan | 59-26239 |
| Feb. 14, 1984 | [JP] | Japan | 59-26240 |
| Jun. 11, 1984 | [JP] | Japan | 59-119260 |

[51] Int. Cl.⁴ .................................... F16H 47/00
[52] U.S. Cl. ............................ 74/731; 74/645
[58] Field of Search .............. 74/731, 866, 645; 192/3.29, 3.3, 3.31, 3.32, 3.33, 3.052

[56] References Cited

U.S. PATENT DOCUMENTS

| | | | |
|---|---|---|---|
| 3,640,151 | 2/1972 | Sumiyoshi et al. | 74/731 |
| 3,690,197 | 9/1972 | Sumiyoshi et al. | 74/731 |
| 3,805,640 | 4/1974 | Schneider et al. | 74/645 |
| 3,810,531 | 5/1974 | Edmunds | 74/645 X |
| 4,004,417 | 1/1977 | Woody et al. | 192/3.33 X |
| 4,457,411 | 7/1984 | Hiramatsu | 192/3.31 X |
| 4,499,979 | 2/1985 | Suzuki et al. | 192/3.31 |
| 4,510,747 | 4/1985 | Yoshida | 74/732 X |
| 4,539,869 | 9/1985 | Suga et al. | 74/731 X |

FOREIGN PATENT DOCUMENTS

| | | | |
|---|---|---|---|
| 2707174 | 8/1977 | Fed. Rep. of Germany | 74/645 |
| 0039066 | 3/1977 | Japan | 192/3.31 |
| 0057959 | 4/1982 | Japan | 74/645 |
| 0157860 | 9/1982 | Japan | 192/3.31 |
| 0017246 | 2/1983 | Japan | 74/645 |
| 0037368 | 3/1983 | Japan | 74/645 |
| 2017840 | 10/1979 | United Kingdom | 192/3.31 |

Primary Examiner—Leslie Braun
Assistant Examiner—Dirk Wright
Attorney, Agent, or Firm—Arthur L. Lessler

[57] ABSTRACT

In a transmission for an automotive vehicle, a control system for a direct-coupling mechanism for mechanically engaging input and output members of a hydraulic power transmission. An operating fluid pressure regulator controls operating fluid pressure applied to a hydraulically operating portion of the direct-coupling mechanism, and the direct-coupling mechanism applies an engaging force corresponding to the operating fluid pressure thus controlled to the input and output members. A vehicle speed sensor detects the speed of the vehicle, and a slip sensor detects the value of a predetermined parameter indicative of an amount of relative slip between the input and output members. When the detected vehicle speed falls between a first predetermined value and a second predetermined value larger than the first predetermined value and at the same time the detected value of the predetermined parameter is outside a predetermined range, a control device causes the operating fluid pressure regulator to vary the magnitude of the operating fluid pressure so that the predetermined parameter falls within the predetermined range.

32 Claims, 21 Drawing Figures

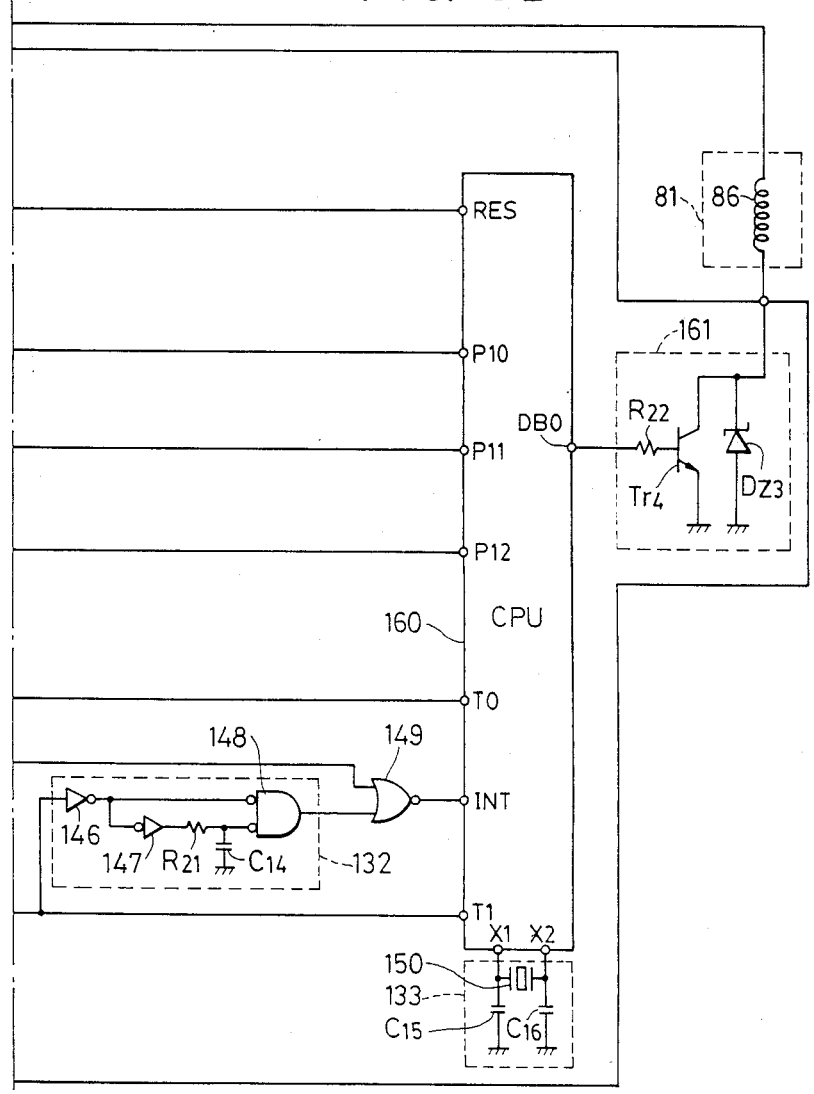
FIG. 5B
FIG. 5
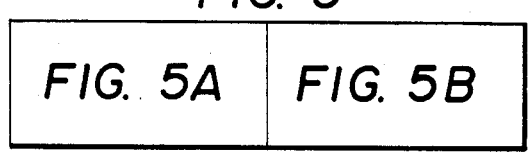

| FIG. 6A | FIG. 6B |

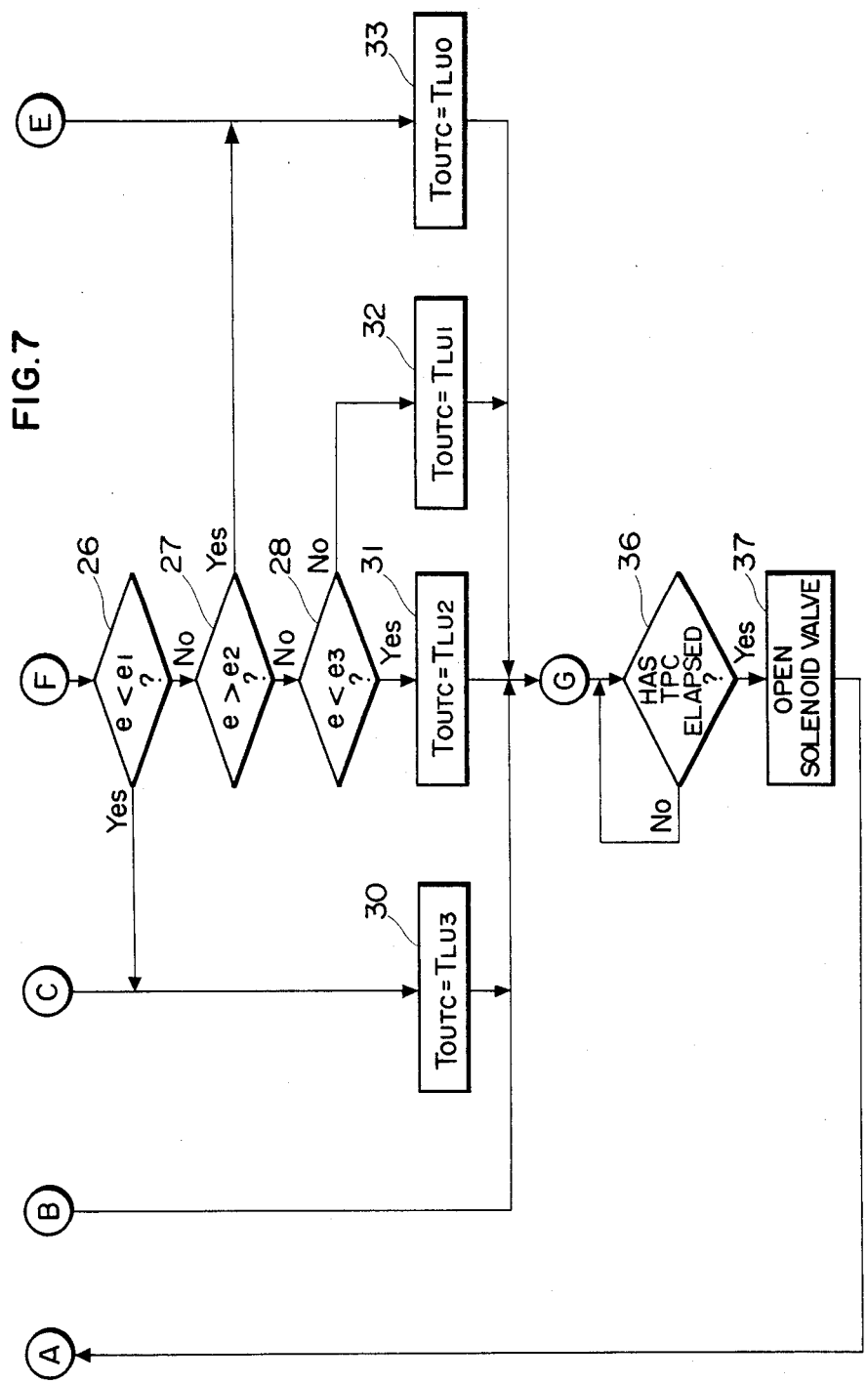

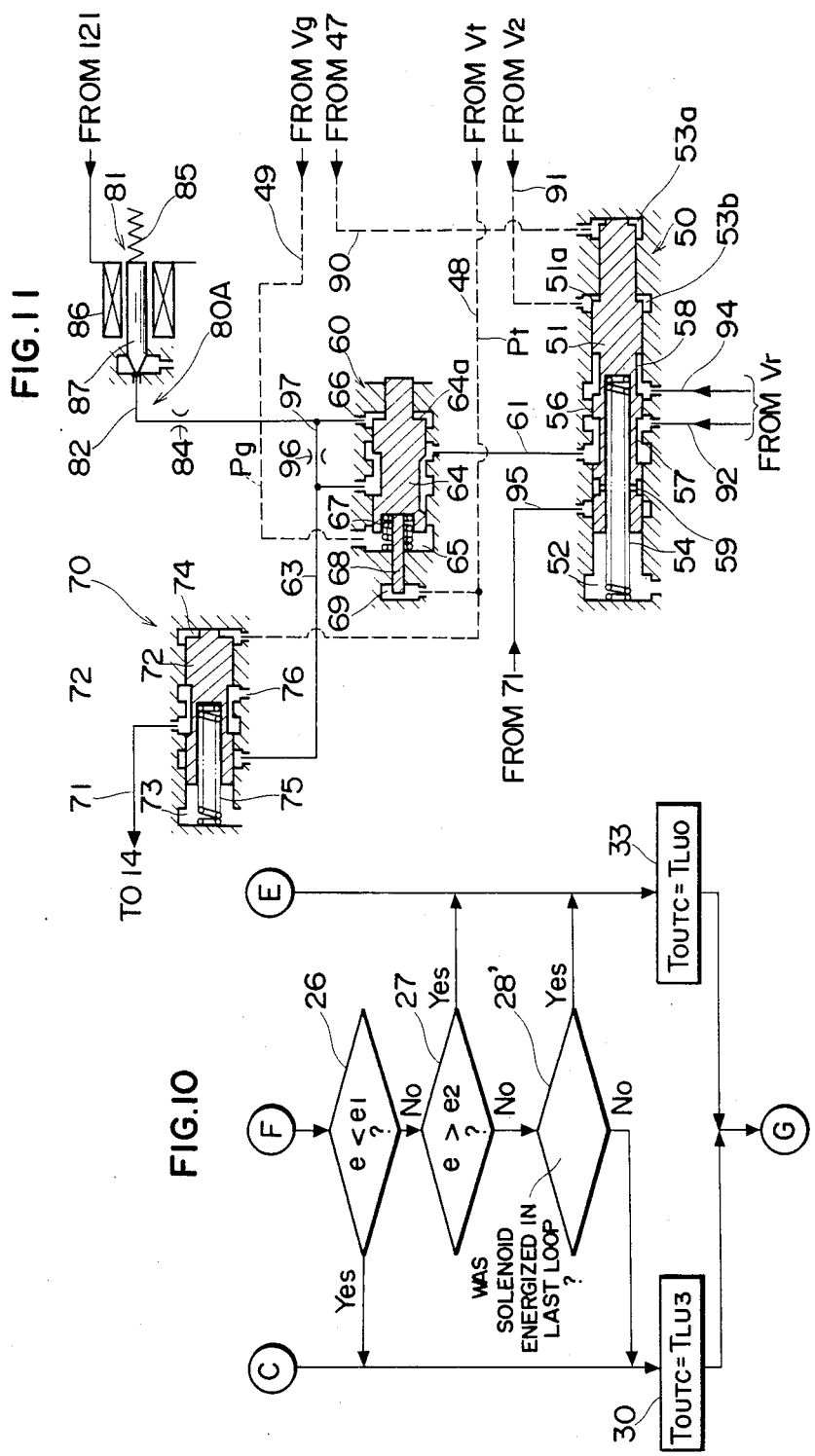

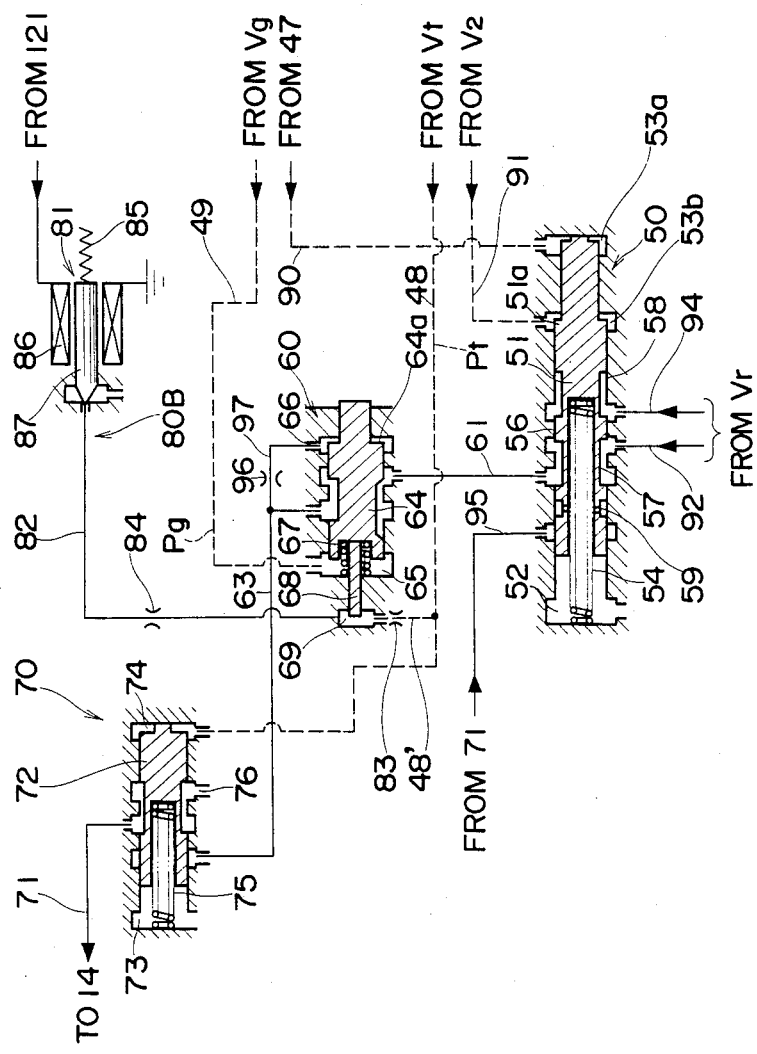

CONTROL SYSTEM FOR A DIRECT-COUPLING MECHANISM IN HYDRAULIC POWER TRANSMISSION MEANS OF A TRANSMISSION FOR AUTOMOTIVE VEHICLES

BACKGROUND OF THE INVENTION

This invention relates to a control system for a direct-coupling mechanism in a hydraulic power transmission means of a transmission for automotive vehicles, and more particularly to a control system of this kind which is adapted to accurately control the engaging force of the direct-coupling mechanism so as to restrain vibrations of the vehicle body due to rotation of the engine and improve the fuel consumption of the engine.

In hydraulic power transmission means as represented by a hydraulic torque converter, a direct-coupling clutch is conventionally well known which is adapted to mechanically directly couple the input member and output member of the torque converter to enhance the transmission efficiency when the torque amplification performed by the torque converter is almost not available. This mechanical direct-coupling can produce good results advantageous in improving the power transmission characteristics, curtailing the fuel consumption, and reducing noise caused by vibration of the vehicle body. To this end, the minimum vehicle speed at which the mechanical direct-coupling is to be effected should desirably be set to a possible lowest value. However, if the mechanical direct-coupling is effected in a low vehicle speed region where also the engine speed is low, it can easily cause large vibrations of the vehicle body as well large vibration noise due to fluctuations of the engine torque which are particularly conspicuous in the low engine speed region.

In order to overcome the above disadvantage, it has been proposed by the present applicants to control the engaging force of the direct-coupling mechanism to vary in proportion to the vehicle speed or in proportion to the throttle valve opening so as to allow slippage in the direct-coupling mechanism instead of fully directly coupling same when there occur certain peak torque fluctuations during operation of the engine in the low vehicle speed region. However, in incorporating the above proposed method into an actual system, other factors should also be taken into account, that also determine the engaging force of the direct-coupling mechanism. If the engaging force is set in consideration of the extent of influence of these factors upon the engaging force as well as the margins of variation of the extent of influence, and also so as not to cause full direct-coupling of the torque converter even at the maximum extents of influence of the factors, the set engaging force has a considerably small median value, resulting in failure to attain to desired extents curtailment of the fuel consumption, improvement of the power transmission characteristics, and minimization of the vibration noise. The other factors referred to above may include, for instance, the operative state of engine load-creating devices such as an air conditioner installed in the vehicle, the atmosphere in which the torque converter is operating, and ageing changes in the operating characteristics of the torque converter, etc. Examples of the influence of such other factors upon the engaging force are as follows: When the air conditioner is operating, the engaging force is increased as the throttle valve opening then increases with an increase in the engine load caused by the operation of the air conditioner. In cold weather, the engaging force decreases while in hot weather, it increases, as the operating oil pressure in the direct-coupling mechanism is influenced by the ambient temperature. In a direct-coupling mechanism formed of a friction clutch, the friction coefficient gradually decreases from its initial or sufficient value with an increase in the accumulated time of use, to result in a gradual decrease in the engaging force.

According to these example of change of the engaging force dependent upon the factors, the engaging force is merely taken as a function of the operating oil pressure and accordingly the operating oil pressure alone is regulated to control the engaging force. However, the problem of improper engaging force can be solved by detecting the rotational speed ratio between the input and output members of the torque converter, the slip rate ($=1-e$) thereof, or a like factor, and controlling such a factor so as to obtain proper engaging force. Basic ideas of feedback control of the slip rate are disclosed in U.S. Pat. Nos. 3,696,896 and 3,966,032. These disclosed ideas appear to be theoretically right, and the disclosed methods employ analogue control to thereby perform smooth direct-coupling control and accordingly good driving feeling. However, according to these prior art methods, the direct-coupling mechanism is allowed to have a certain slip rate even at high speed operation when there is no fear of occurrence of vibrations of the vehicle body, thus being disadvantageous in respect of fuel consumption of the engine and effective life of the direct-coupling mechanism. Further, accurate control of the engaging force is not necessary in a low vehicle speed region where the direct-coupling mechanism is required to exhibit torque amplifying function. For example, in the aforesaid method proposed by the present applicants the engaging force of the direct-coupling mechanism is increased in proportion to the vehicle speed or to the throttle valve opening. Thus, slip should necessarily occur in the direct-coupling mechanism at first speed (low gear) operation and at second speed (second gear) operation, which operations are often applied for acceleration. Therefore, the slip rate control is not necessary to the present applicants' proposed method during these operations. Moreover, generally, at first speed operation and at second speed operation the engine rotational speed is high for the small gear ratios, with a very small possibility of occurrence of vehicle body vibrations.

Therefore, only at fourth speed (top gear) operation, and if perfect safety is desired, also at third speed (third gear) operation, the direct-coupling control system is required to effect slip rate control, while at operation such as first speed operation and second speed operation wherein slip should occur in the direct-coupling mechanism in response to peak fluctuations of the torque, no slip rate control should be carried out in view of curtailment of the fuel consumption. Further, when acceleration such as standing start of the vehicle is required, it is more advantageous in ensuring smooth driveability to allow slippage in the fluid coupling, instead of resorting to the slip rate control.

In carrying out slip rate control only at fourth speed operation, and if required, at third speed operation, to discriminate whether the vehicle is running in the fourth speed or third speed position or in another speed position is very difficult, except for a control system employing electronic control for gear shifting. For such discrimination, a special auxiliary device is required, such as a pressure switch operable to open or close at a specific operating oil pressure for engaging the fourth speed clutch or the third speed clutch, which will complicate the structure of the control system.

SUMMARY OF THE INVENTION

It is an object of the invention to provide a control system for a direct-coupling mechanism of a hydraulic power transmission means in an automotive transmission, which is adapted to control the engaging force of the direct-coupling mechanism to optimum values only when the vehicle is operated in a region wherein the engaging force of the direct-coupling mechanism has to be controlled with accuracy, to thereby restrain the occurrence of vibrations of the vehicle body and noise caused by the vibrations, and improve the fuel consumption as well as the driving feeling to a degree very close to that obtained through analog control.

It is another object of the invention to provide a control system for a direct-coupling mechanism of a hydraulic power transmission means in an automotive transmission, which is capable of controlling the engaging force of the direct-coupling mechanism to an optimum value without detecting the speed reduction ratio established by an automatic transmission of the vehicle.

The present invention provides a control system for controlling a direct-coupling mechanism having a hydraulically operating portion and operable to mechanically engage an input member and an output member of hydraulic power transmission means with each other. Operating fluid pressure regulating means is arranged between the hydraulically operating portion of the direct-coupling mechanism and an operating fluid source, to control the operating fluid pressure applied to the hydraulically operating portion of the direct-coupling mechanism so that the direct-coupling mechanism applies an engaging force corresponding to the magnitude of the operating fluid pressure thus controlled to the input and output members. Vehicle speed sensor means detects the speed of the vehicle, and slip sensor means detects the value of a predetermined parameter indicative of an amount of relative slip between the input and output members. When the detected vehicle speed falls between a first predetermined value and a second predetermined value larger than the first predetermined value and at the same time the detected value of the predetermined parameter is outside a predetermined range, control means causes the operating fluid pressure regulating means to vary the magnitude of the operating fluid pressure so that the predetermined parameter falls within the predetermined range.

According to a typical embodiment of the invention, the input member of the hydraulic power transmission means is connected to an internal combustion engine, and the output member thereof to an auxiliary transmission, respectively. The auxiliary transmission has a plurality of gear trains for providing respective different gear ratios, and selector means which forms a plurality of combinations of the gear trains, and operable at human will to select one of the above combinations. Vehicle speed sensor means detects the speed of the vehicle, and rotational speed ratio sensor means detects the ratio between the rotational speed of the output member and that of the input member. When the vehicle speed detected by the vehicle speed sensor means falls between a first predetermined value and a second predetermined value larger than the first predetermined value and at the same time the rotational speed ratio detected by the rotational speed ratio sensor means is smaller than a predetermined lower limit value, control means causes the operating fluid pressure regulating means to increase the operating fluid pressure so that the direct-coupling mechanism applies a first engaging force to the input and output members, while when the vehicle speed detected by the vehicle speed sensor means falls between a first predetermined value and a second predetermined value larger than the first predetermined value and at the same time the detected rotational speed ratio is larger than a predetermined upper limit value, the control means causes the operating fluid pressure regulating means to decrease the operating fluid pressure so that the direct-coupling mechanism applies a second engaging force smaller than the first engaging force to the input and output members, to thereby control the rotational speed ratio between the input and output members so as to fall within a range determined by the predetermined upper and lower limit values.

Preferably, when the rotational speed ratio between the input and output members falls between the predetermined upper and lower limit values, the control means causes the operating fluid pressure regulating means to vary the operating fluid pressure so that the direct-coupling mechanism applies a medium engaging force intermediate between the first and second engaging forces to the input and output members.

Still preferably, when the vehicle speed detected by the vehicle speed sensor means is larger than the second predetermined value, the control means causes the operating fluid pressure regulating means to increase the operating fluid pressure so that the direct-coupling mechanism applies the first engaging force to the input and output members, irrespective of the detected value of the rotational speed ratio between the input and output members. When the detected vehicle speed is smaller than the first predetermined value, the control means causes the operating fluid pressure regulating means to decrease the operating fluid pressure so that the direct-coupling mechanism applies the second engaging force to the input and output members, irrespective of the detected value of the rotational speed ratio between the input and output members.

Further preferably, the control system for the direct-coupling mechanism includes shift position sensor means for detecting a combination of the gear trains selected by the selector means, and engine rotational speed sensor means for detecting the rotational speed of the engine. The aforementioned rotational speed ratio sensor means is adapted to detect the rotational speed ratio between the input and output members on the basis of the vehicle speed detected by the vehicle speed sensor means, the combination of the gear trains detected by the shift position sensor means, and the rotational speed of the engine detected by the engine rotational speed sensor means.

Still further preferably, when the vehicle speed detected by the vehicle speed sensor means is larger than a third predetermined value larger than the first predetermined value and at the same time smaller than the second predetermined value, the rotational speed ratio between the input and output members is detected on the basis of the smallest one of gear ratios which are provided by the combination of the gear trains detected by the shift position sensor means. When the detected vehicle speed is smaller than the third predetermined value, the rotational speed ratio is detected on the basis of the second smallest one of the gear ratios which are provided by the combination of the gear trains detected by the shift position sensor means.

Preferably, the range of the rotational speed ratio determined by the predetermined upper and lower limit values is shifted to a second range when the rotational speed ratio detected by the rotational speed ratio sensor means remains within the first-mentioned range for a predetermined period of time.

Also preferably, the control system for the direct-coupling mechanism includes change rate sensor means for detecting the rate of change in the rotational speed ratio between the input and output members relative to the lapse of time. When the detected rate of change in the rotational speed ratio relative to the lapse of time is larger than a predetermined reference value, the aforementioned control means causes the operating fluid pressure regulating means to decrease the operating fluid pressure so that the direct-coupling mechanism applies the second engaging force to the input and output means, irrespective of the detected value of the rotational speed ratio between the input and output members.

Still preferably, the operating fluid pressure control means includes pilot pressure generating means for generating a pilot pressure dependent at least on the value of a parameter indicative of the loaded condition of the engine, and fluid pressure modulating means for generating a fluid pressure proportional to the pilot pressure generated by the pilot pressure generating means and applying same as the operating fluid pressure to the hydraulically operating portion of the direct-coupling mechanism, while the control system for the direct-coupling mechanism includes pressure reducing means for reducing the pilot pressure generated by the pilot pressure generating means. Further, the vehicle is equipped with at least one load-creating equipment which applies a load on the engine when operated, and the control system for the direct-coupling mechanism includes operation sensor means for detecting the operative state of the load-creating equipment to determine the load on the engine therefrom. When the load determined from the operative state of the load-creating equipment determined by the operation sensor means is larger than a predetermined value, the control means causes the pressure reducing means to decrease the pilot pressure irrespective of the detected value of the rotational speed ratio between the input and output members.

The above and other objects, features and advantages of the invention will be more apparent from the ensuing detailed description taken in conjunction with the accompanying drawings.

BRIEF DESCRIPTION OF THE DRAWINGS

FIG. 5 is a composite of FIGS 5A and 5B.

FIGS. 5A and 5B constitute a circuit diagram showing the arrangement of an electronic control circuit appearing in FIG. 2;

FIG. 7 is a flowchart of the remaining part of the program of FIG. 6;

FIG. 10 is a modification of part of the program of FIG. 7;

FIG. 11 is a circuit diagram of essential part of the hydraulic control system of the control system, according to a second embodiment of the invention;

FIG. 12 is a circuit diagram of essential part of the hydraulic control system, according to a third embodiment of the invention;

DETAILED DESCRIPTION

The invention will now be described in detail with reference to the drawings illustrating embodiments thereof.

Figure 1:
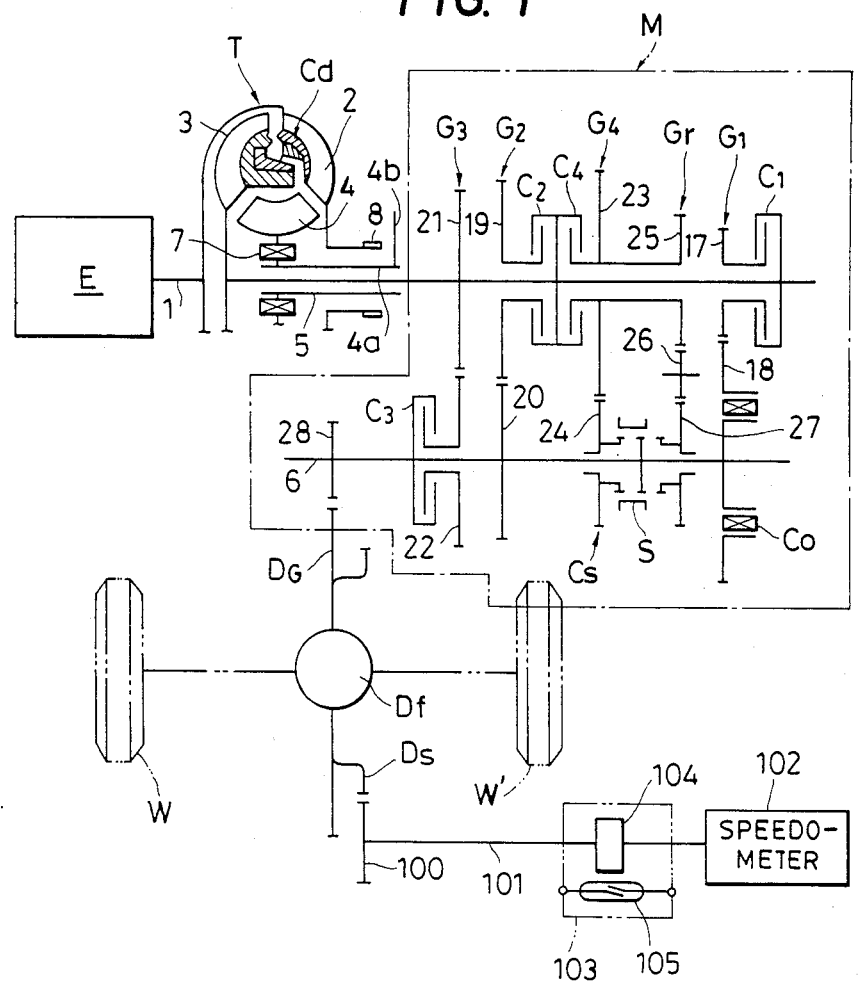
FIG. 1 is a schematic view of an automatic transmission for automotive vehicles, to which is applied the control system for a direct-coupling clutch according to the invention.

Referring first to FIG. 1, there is schematically illustrated an automatic transmission for automotive vehicles, to which the invention is applied. Output from an engine E is transmitted to left and right driving wheels W and W' through a crankshaft 1 of the engine, a hydraulic torque converter T serving as a hydraulic power transmission, an auxiliary transmission M, and a differential Df in the mentioned order.

The hydraulic torque converter T comprises a pump 2 coupled to the crankshaft 1, a turbine 3 coupled to an input shaft 5 of the auxiliary transmission M, and a stator 4 coupled, via a one-way clutch 7, to a stator shaft 4a which in turn is supported on the input shaft 5 for rotation relative thereto. Torque is transmitted from the crankshaft 1 to the pump 2, and then to the turbine 3 in a hydrodynamic manner. When amplification of torque takes place while torque is transmitted from the pump 2 to the turbine 3, the resulting reaction force is borne by the stator 4, as is already known.

Figure 2:
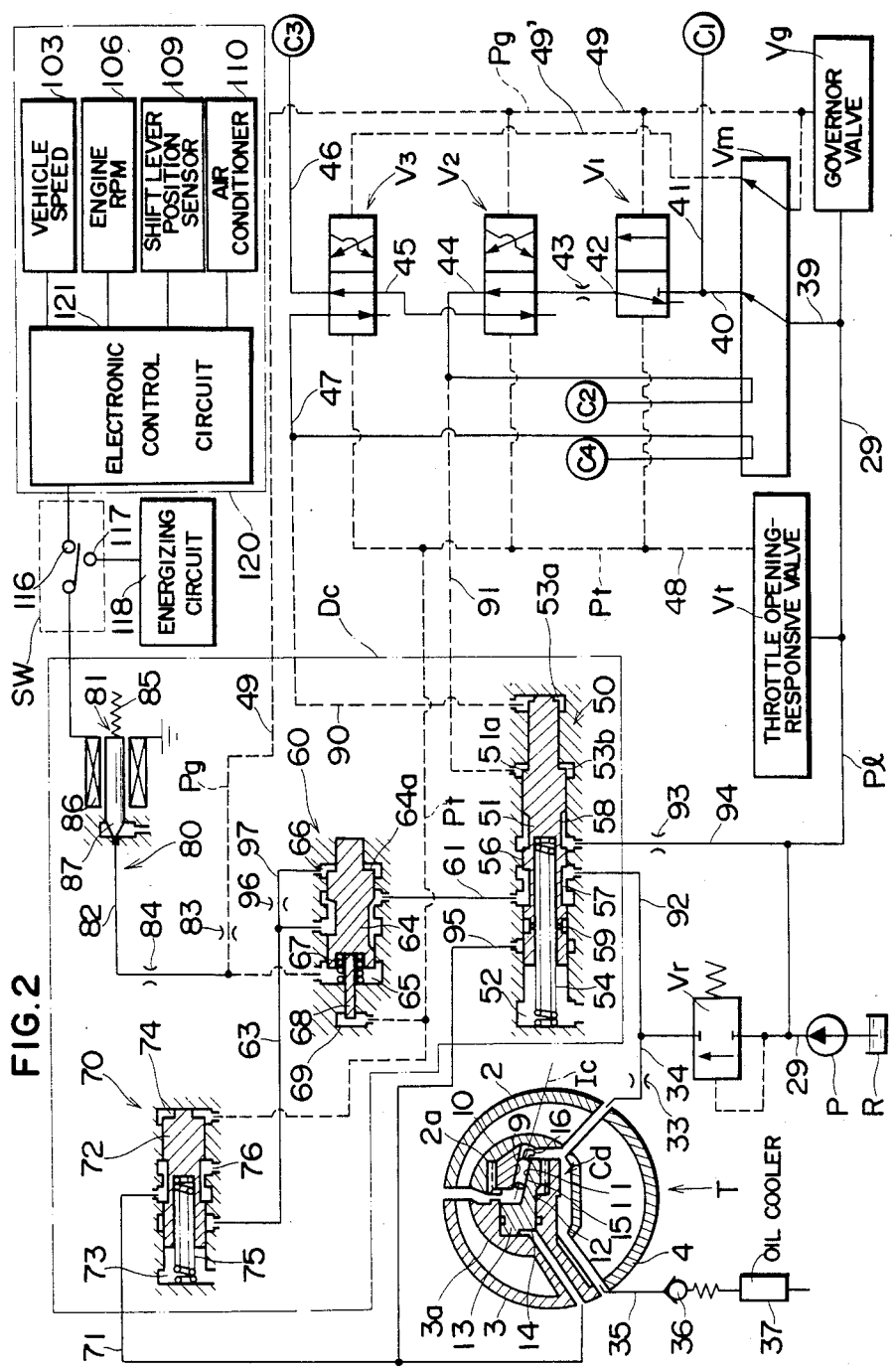
FIG. 2 is a circuit diagram illustrating a hydraulic control system employed in the automatic transmission shown in FIG. 1, in which is incorporated the direct-coupling clutch control system according to one embodiment of the invention.

A pump driving gear 8 is arranged on a right end of the pump 2 as viewed in FIG. 1, for driving an oil hydraulic pump P appearing in FIG. 2. A stator arm 4b is secured to a right end of the stator shaft 4a for controlling a regulator valve Vr appearing in FIG. 2.

Figure 3:
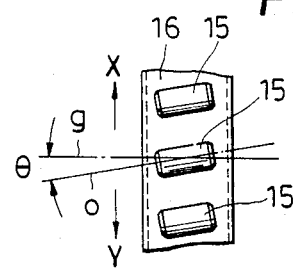
FIG. 3 is a development of essential part of the direct-coupling clutch appearing in FIG. 2.

A direct-coupling clutch Cd, which is a roller clutch type, is interposed between the pump 2 and the turbine 3 for mechanically coupling them with each other. Referring now to FIGS. 2 and 3 showing in further detail the direct-coupling clutch Cd, an annular driving member 10 having a driving conical surface 9 at its inner periphery is spline-fitted in an inner peripheral wall 2a of the pump 2, whereas an annular driven member 12, which has a driven conical surface 11 at its outer periphery extending parallel with the driving conical surface 9, is slidably spline-fitted in an inner peripheral wall 3a of the turbine 3 for axial movement relative thereto. The driven member 12 has its one end formed integrally with a piston 13 slidably received within an oil hydraulic cylinder 14 formed in the inner peripheral wall 3a of the turbine 3. The piston 13 receives a pressure in the cylinder 14 and a pressure in the torque converter T at the same time, respectively, at its both or left and right end faces.

Cylindrical clutch rollers 15 are interposed between the driving and driven conical surfaces 9, 11 and retained in place by an annular retainer 16 in a manner such that, as shown in FIG. 3, the clutch rollers 15 each have its axis o inclined by a predetermined angle θ relative to the generating line g of a virtual conical surface Ic, shown in FIG. 2, which extends between the conical surfaces 9, 11 along the middle thereof.

When the torque converter T is not required to amplify the torque transmitted thereto, an oil pressure which is higher than the internal pressure of the torque converter T is supplied to the cylinder 14 to cause the piston 13, i.e. the driven member 12, to move toward the driving member 10, whereby the clutch rollers 15 are urgedly held between the conical surfaces 9, 11. With the clutch rollers 15 thus urgedly held between the conical surfaces 9, 11, if output torque from the engine E causes rotation of the driving member 10 in the direction indicated by the arrow X in FIG. 3 relative to the driven member 12, the clutch rollers 15 rotate about their own axes to provide relative axial displacement of the members 10, 12 in a direction such that the members 10, 12 approach toward each other, since the axis o of each clutch roller 15 is inclined relative to the generating line g, as hereinbefore described. Consequently, the clutch rollers 15 bitingly engage with the conical surfaces 9, 11 to establish mechanical coupling between the members 10, 12, i.e. the pump 2 and the turbine 3 of the torque converter T. Even on this occasion, if engine output torque exceeding the coupling force of the direct-coupling clutch Cd is applied between the pump 2 and the turbine 3, the clutch rollers 15 can slip on the conical surfaces 9, 11 to divide the engine output torque into two parts, wherein part of the torque is mechanically transmitted through the direct-coupling clutch Cd while the remaining torque is hydrodynamically transmitted from the pump 2 to the turbine 3. Therefore, the ratio between the mechanically transmitted torque and the hydrodynamically transmitted torque is variable dependent on the degree of slipping of the clutch rollers 15.

On the other hand, if a reverse load is applied to the torque converter T during operation of the direct-coupling clutch Cd, the rotational speed of the driven member 12 becomes larger than that of the driving member 10, that is, the driving member 10 rotates in the direction indicated by the arrow Y in FIG. 3 relative to the driven member 12. Consequently, the clutch rollers 15 rotate in a direction reverse to that mentioned above, to cause relative axial displacement of the members 10, 12 in a direction of moving the same members 10, 12 away from each other. Thus, the clutch rollers 15 are released from biting engagement with the conical surfaces 9, 11 to run idle so that the reverse load is transmitted from the turbine 3 to the pump 2 only in a hydrodynamic manner.

As the oil hydraulic cylinder 14 is released from the oil pressure, the piston 13 is displaced to its initial position by the internal pressure of the torque converter T acting thereupon, thereby rendering the direct-coupling clutch Cd inoperative.

Referring again to FIG. 1, the auxiliary transmission M has an output shaft 6 extending parallel with the input shaft 5, and is provided with a first-speed gear train G1, a second-speed gear train G2, a third-speed gear train G3, a fourth-speed gear train G4, and a reverse gear train Gr, all arranged in juxtaposition between the input and output shafts 5, 6. The first-speed gear train G1 comprises a driving gear 17 connectible to the input shaft 5 through a first-speed clutch C1, and a driven gear 18 connectible to the output shaft 6 through a one-way clutch C0 and engaging with the driving gear 17. The second-speed gear train G2 comprises a driving gear 19 connectible to the input shaft 5 through a second-speed clutch C2, and a driven gear 20 secured to the output shaft 6 and engaging with the driving gear 19, while the third-speed gear train G3 comprises a driving gear 21 secured to the input shaft 5, and a driven gear 22 connectible to the output shaft 6 through a third-speed clutch C3 and engaging with the driving gear 21. The fourth-speed gear train G4 comprises a driving gear 23 connectible to the input shaft 5 through a fourth-speed clutch C4, and a driven gear 24 connectible to the output shaft 6 through a selector clutch Cs and engaging with the driving gear 23. On the other hand, the reverse gear train Gr comprises a driving gear 25 formed integrally with the driving gear 23 of the fourth-speed gear train G4, a driven gear 27 connectible to the output shaft 6 through the selector clutch Cs, and an idle gear 26 engaging with the gears 25, 27. The selector clutch Cs is arranged between the driven gears 24 and 27, and has a selector sleeve S which is shiftable between a left or forward position and a right or reverse position as viewed in FIG. 1, to selectively connect the driven gear 24 or 27 to the output shaft 6. The one-way clutch C0 permits the driving torque from the engine E alone to be transmitted to the driving wheels W, W', while prohibiting transmission of torque from the driving wheels W, W' to the engine E.

If the first-speed clutch C1 alone is engaged while the selector sleeve S is held in the forward position as illustrated in FIG. 1, the driving gear 17 is connected to the input shaft 5 to establish the first-speed gear train G1, thereby allowing transmission of torque from the input shaft 5 to the output shaft 6 therethrough. Then, if the second-speed clutch C2 is engaged with the first-speed clutch C1 maintained in its engaged state, the driving gear 19 is connected to the input shaft 5 to establish the second-speed gear train G2 through which torque can be transmitted from the input shaft 5 to the output shaft 6. That is, even while the first-speed clutch C1 is engaged, the second-speed gear train G2, the third-speed gear train G3 or the fourth-speed gear train G4 can be established by the action of the one-way clutch C0, rendering the first-speed gear train G1 substantially inoperative. If the second-speed clutch C2 is disengaged and the third-speed clutch C3 is engaged instead, the driven gear 22 is connected to the output shaft 6 to establish the third-speed gear train G3, while if the third-speed clutch C3 is disengaged and the fourth-speed clutch C4 is engaged instead, the driving gear 23 is connected to the input shaft 5 to thereby establish the fourth-speed gear train G4. On the other hand, if the fourth-speed clutch C4 alone is engaged while the selector sleeve S of the selector clutch Cs is shifted to the right or reverse position, the driving gear 25 and the driven gear 27 are connected, respectively, to the input shaft 5 and the output shaft 6 to establish the reverse gear train Gr, thereby allowing transmission of torque from the input shaft 5 to the output shaft 6 through the reverse gear train Gr.

The torque transmitted to the output shaft 6 is then transmitted through an output gear 28 mounted on one end of the output shaft 6 to an enlarged gear DG of the differential Df.

A gear Ds is secured to the enlarged gear DG of the differential Df and engages with a gear 100, and a speedometer cable 101 has one end secured to the gear 100 and the other end to a speedometer 102 of the vehicle, respectively. A magnet 104 of a vehicle speed sensor 103 is mounted on the speedometer cable 104. The speedometer 102 is thus driven through the gears Ds, 100 and the speedometer cable 101 to indicate the speed of the vehicle, while the vehicle speed sensor 103 comprises the aforementioned magnet 104, and a reed switch 105 driven by the magnet 104, for instance. Rotation of the magnet 104 in unison with the speedometer cable 101 causes alternate closing and opening of the reed switch 105, and an on-off signal indicative of closing and opening of the reed switch 105 is supplied to a control system 120 hereinafter referred to.

Referring now to FIG. 2, the oil hydraulic pump P sucks oil from an oil tank R for pressure delivery of same to fluid lines 29 and 94. The pressurized oil from the pump P has its pressure regulated to a predetermined value (hereinafter called "the line pressure P1") by the regulator valve Vr, and is then delivered to a manual shift valve Vm, a throttle opening-responsive valve Vt, a governor valve Vg, and a timing valve 50.

Having been regulated to a predetermined pressure value by the regulator valve Vr, the pressurized oil is in part delivered to the interior of the torque converter T through an inlet fluid line 34 provided with a restriction 33, to increase the internal pressure of the torque converter T for prevention of cavitation therein. A check valve 36 is arranged in an outlet fluid line 35 of the torque converter T, and oil passing through the check valve 36 is returned to the oil tank R through an oil cooler 37.

The throttle opening-responsive valve Vt generates as a parameter representative of the output of the engine E a throttle pressure Pt corresponding to the stepping amount of an accelerator pedal, not shown, of the engine E, i.e. the valve opening of a throttle valve, not shown, arranged in the intake system of the engine E, and supplies same to a pilot fluid line 48. On the other hand, the governor valve Vg is rotatively driven by the output shaft 6 of the auxiliary transmission M or the enlarged gear DG of the differential Df, to generate a governor pressure Pg variable in response to the vehicle speed and supply same to a pilot fluid line 49.

The manual shift valve Vm is arranged between a fluid line 39 branching off from the fluid line 29 and a fluid line 40, and shiftable between a neutral position, a second-speed holding (2ND) position, drive range (D3 and D4) positions, and a reverse position. The fluid lines 39, 40 communicate with each other when the manual shift valve Vm assumes the second-speed holding (2ND) position or the D3 or D4 drive range position. While the manual shift valve Vm is in the second-speed holding (2ND) position, no gear shifting is allowed but the second-speed (2ND) transmission gear ratio is maintained. On the other hand, when the manual shift valve Vm is in the D3 drive range position, gear shifting can be effected between the first-speed (LOW), second-speed (2ND) and third-speed (3RD) transmission gear ratios except the fourth-speed (TOP) transmission gear ratio, while when the manual shift valve Vm is in the D4 drive range position, automatic gear shifting can take place between the first-speed (LOW) through fourth-speed (TOP) transmission gear ratios. These positions assumed by the manual shift valve Vm are selectively established by means of a shift lever, not shown, of the vehicle.

A fluid line 41 branching off from the fluid line 40 is connected to a hydraulically operating portion of the first-speed clutch C1, and accordingly the first-speed clutch C1 is maintained in an engaged state as long as the manual shift valve Vm is in the D3 or D4 drive range position. The pressurized oil in the fluid line 40 is not only supplied to the first-speed clutch C1, but selectively delivered to hydraulically operating portions of the second-speed to fourth-speed clutches C2–C4 in dependence on the positions assumed by a 1–2 shift valve V1, a 2–3 shift valve V2, and a 3–4 shift valve V3, as hereinafter described.

The shift valves V1–V3 each have a spool having one end face acted upon by the throttle pressure Pt and the other end by the combined force of a spring, not shown, and the governor pressure Pg, respectively, and are adapted to shift from a left or first position to a right or second position when the governor pressure Pg exceeds the combined force of the throttle pressure Pt and the spring with an increase in the the governor pressure Pg, i.e. an increase in the vehicle speed. The forces of the springs of the shift valves V1–V3 are set at different values from each other. The shift valves V1, V2 have pilot ports facing the one end faces of the respective spools and directly connected to the governor valve Vg through the pilot fluid line 49, while the shift valve V3 has a pilot port facing the one end face of its spool and connected to the governor valve Vg through a pilot fluid line 49' and the manual shift valve Vm. The pilot fluid line 49' is connected to the governor valve Vg, when the manual shift valve Vm assumes the D4 drive range position, as in the illustrated position of FIG. 2, and is connected to the oil tank R when the shift valve Vm assumes the D3 drive range position. Incidentally, FIG. 2, shows a position wherein the manual shift valve Vm is in the D4 drive range position. The 1–2 shift valve V1 is arranged between the fluid line 40 and a fluid line 42 provided with a restriction 43, and assumes the first position as illustrated when the vehicle speed is low, to disconnect the fluid line 42 from the fluid line 40. With the 1–2 shift valve V1 held in this position, the first-speed clutch C1 alone becomes engaged to establish the first-speed reduction ratio.

As the vehicle speed increases with the manual shift valve Vm held in the D4 drive range position as illustrated, the 1–2 shift valve V1 is shifted to the right or second position to communicate the fluid lines 40, 42 with each other. On this occasion, the 2–3 shift valve V2 is in the first position as illustrated, to communicate the fluid line 42 with a fluid line 44 connected to the hydraulically operating portion of the second-speed clutch C2. Although both the first-speed and second-speed clutches C1, C2 are engaged on this occasion, the second-speed gear train G2 alone is established by the action of the one-way clutch C0 in FIG. 1, thereby establishing the second-speed reduction ratio.

When the vehicle speed further increases, the 2–3 shift valve V2 is shifted to the right or second position to communicate the fluid line 42 with a fluid line 45. On this occasion, the 3–4 shift valve V3 still assumes the left or first position as illustrated, to communicate the fluid line 45 with a fluid line 46 connected to the hydraulically operating portion of the third-speed clutch C3, whereby the third-speed clutch C3 becomes engaged to establish the third-speed reduction ratio.

The 3–4 shift valve V3 is shifted to the right or second position with a further increase in the vehicle speed, and the fluid line 45 is communicated with a fluid line 47 connected to the hydraulically operating portion of the fourth-speed clutch C4 so that the fourth-speed clutch C4 becomes engaged to establish the fourth-speed reduction ratio.

As long as the manual shift valve Vm assumes the D3 drive range position, the pilot fluid line 49' is kept disconnected from the governor valve Vg to hold the 3–4 shift valve V3 in the first position as illustrated, thereby preventing the fourth-speed reduction ratio from being established even with an increase in the vehicle speed.

A control device Dc for controlling the operating oil pressure for the direct-coupling clutch Cd will now be described with further reference to FIG. 2. The control device Dc comprises the timing valve 50, a modulator valve 60, an idle release valve 70, and a selector means 80 for selectively setting the operating oil pressure in two steps, i.e. to higher and lower levels. The operation of the selector means 80 is controlled by a control system 120.

The timing valve 50 operates to temporarily interrupt the engagement of the direct-coupling clutch Cd, i.e. the locking-up of the torque converter T, at changeover of speed reduction ratio of the auxiliary transmission M, and comprises a spool valve body 51 movable between a right or first position and a left or second position, a first pilot pressure chamber 52 defined in part by a left end face of the valve body 51, a second pilot pressure chamber 53a defined in part by a right end face of the valve body 51, a third pilot pressure chamber 53b defined in part by a stepped shoulder 51a formed on the right end portion of the valve body 51, and a spring 54 urging the valve body 51 rightward as viewed in FIG. 2. The first pilot pressure chamber 52 communicates with the oil tank R, while the second pilot pressure chamber 53a communicates with a fluid line 90 which branches off from the fluid line 47 connected to the fourth-speed clutch C4. The third pilot pressure chamber 53b communicates with a pilot fluid line 91 which branches off from the fluid line 44 connected to the second-speed clutch C2. The pressure-receiving area of the valve body 51 facing the second pilot pressure chamber 53a is substantially equal to that of the same valve body 51 facing the third pilot pressure chamber 53b. The valve body 51 has its outer peripheral surface formed with two annular grooves 57 and 58 with a land 56 interposed therebetween. When the valve body 51 assumes the first position as illustrated, a fluid line 92 is communicated through the annular groove 57 with an output fluid line 61 connected to the modulator valve 60, to deliver the pressure-regulated oil from the regulator valve Vr to the modulator valve 60. Even when the valve body 51 assumes the left or second position, the fluid line 92 is still communicated with the output fluid line 61, but now through the annular groove 58. When the valve body 51 passes an intermediate position between the first and second positions, the fluid lines 61, 92 are temporarily disconnected from each other by the land 56 and the fluid line 92 is communicated with a fluid line 94 provided with a restriction 93, to supply the torque converter T with an increased amount of operating oil to increase the internal pressure of the torque converter T. On this occasion, a fluid line 71, which is connected to the oil hydraulic cylinder 14 of the direct-coupling clutch Cd, is communicated with the first pilot pressure chamber 52, i.e. the oil tank R, through a fluid line 95 branching off from the fluid line 71 and an oil passage 59 formed through the valve body 51. Therefore, the locking-up of the direct-coupling clutch Cd can easily be interrupted upon gear shifting for changeover of the speed reduction ratio.

The modulator valve 60 is arranged between the output fluid line 61 and a fluid line 63, and comprises a spool valve body 64 movable between a left or closed position and a right or open position, a first pilot pressure chamber 65 defined in part by a left end face of the valve body 64, a second pilot pressure chamber 66 defined in part by a stepped shoulder 64a formed on the right end portion of the valve body 64, a plunger 68 projecting into the first pilot pressure chamber 65 and disposed for urging contact with the left end face of the valve body 64, a third pilot pressure chamber 69 defined in part by a left end face of the plunger 68, and a spring 67 accommodated within the first pilot pressure chamber 65. The first pilot pressure chamber 65 is communicated with the governor valve Vg through the pilot fluid line 49 to be supplied with the governor pressure Pg, while the third pilot pressure chamber 69 is communicated with the throttle opening-responsive valve Vt through the pilot fluid line 48 and therefore is supplied with the throttle pressure Pt. The second pilot pressure chamber 66 is connected to the fluid line 63 through a fluid line 97 provided with a restriction 96.

More specifically, the valve body 64 of the modulator valve 60 is urged toward its open position by the throttle pressure Pt, the governor pressure Pg and the urging force of the spring 67, and is at the same time urged toward its closing position by the output oil pressure of the modulator valve 60 per se. That is, the modulator valve 60 operates to increase the oil pressure to be applied to the fluid line 63, i.e. the operating oil pressure for the direct-coupling clutch Cd, in proportion to an increase in the vehicle speed and/or an increase in the throttle valve opening.

The idle release valve 70 is arranged between the fluid line 63 and the fluid line 71 communicating with the oil hydraulic cylinder 14 of the direct-coupling clutch Cd, and comprises a spool valve body 72 movable between a right or closed position and a left or open position, a first pilot pressure chamber 73 defined in part by a left end face of the valve body 72, a second pilot pressure chamber 74 defined in part by a right end face of the valve body 72, and a spring 75 urging the valve body 72 toward its closed position. The first pilot pressure chamber 73 communicates with the oil tank R, while the second pilot pressure chamber 74 is connected to the pilot fluid line 48 to be supplied with the throttle pressure Pt.

When the oil pressure in the second pilot pressure chamber 74 is smaller than the urging force of the spring 75, the idle release valve 70 assumes the closed position as illustrated, and therefore the operating oil in the oil hydraulic cylinder 14 of the direct-coupling clutch Cd is drained to the oil tank R through the fluid line 71 and a release port 76 of the idle release valve 70. On the other hand, when the throttle pressure Pt introduced into the second pilot pressure chamber 74 becomes larger than the urging force of the spring 75, the valve body 72 is displaced leftward as viewed in FIG. 2 to communicate the fluid lines 63, 71 with each other, thereby rendering the direct-coupling clutch Cd operative. Thus, the idle release valve 70 acts to interrupt the engagement of the direct-coupling clutch Cd, i.e. interrupt the locking-up of the torque converter T, when the throttle valve opening shows an idle position value.

The selector means 80 comprises a drain line 82 provided with a solenoid valve 81 of the normally closed type, a restriction 83 arranged in the pilot fluid line 48, and a restriction 84 arranged in the drain line 82. The drain line 82 branches off from the pilot fluid line 49 at a location between the first pilot pressure chamber 65 of the modulator valve 60 and the restriction 83, and communicates with the oil tank R. The solenoid valve 81 has its valve body 87 permanently urged toward its closed position by a spring 85, and when its solenoid 86 is energized, the valve body 87 is displaced to its open position against the urging force of the spring 85.

While the solenoid valve 81 of the selector means 80 is closed, the governor pressure Pg is applied to the first pilot pressure chamber 65 of the modulator valve 60 without being modulated. Therefore, the output of the modulator valve 60, i.e. the operating oil pressure to be applied to the oil hydraulic cylinder 14 via the idle release valve 70 and the fluid line 71, increases in proportion to an increase in the vehicle speed, as indicated by the solid line I in FIG. 4. Incidentally, the graph of FIG. 4 does not plot changes of the throttle pressure Pt for simplification of explanation, and the operating oil pressure curve indicated by the solid line I is one obtained under the assumption that the throttle valve opening shows an idle position value and the spring 67 of the modulator valve 60 is omitted.

On the other hand, when the solenoid valve 81 is open, the pilot oil pressure is applied to the first pilot pressure chamber 65 of the modulator valve 60 after having been modulated by the two restrictions 83, 84. If, for instance, the two restrictions 83, 84 are identical in substantial configuration, e.g. in cross-sectional area, the resulting pilot oil pressure modulated by the restrictions 83, 84 is equal to half of the governor pressure Pg. Therefore, the output pressure of the modulator valve 60, i.e. the operating oil pressure for the oil hydraulic cylinder 14, will show a curve half in value as high as the operating oil pressure curve indicated by the solid line I in FIG. 4, assuming that the spring 67 is omitted. Here, the modulated oil pressure Pc acting upon the first pilot pressure chamber 65 can be expressed by the following equation:

$$Pc = \frac{1}{1 + (F2/F1)^2} \times Pg = \frac{1}{\alpha} \times Pg$$

where F1 represents the cross-sectional area of the restriction 83, and F2 the cross-sectional area of the restriction 84, respectively.

Figure 4:
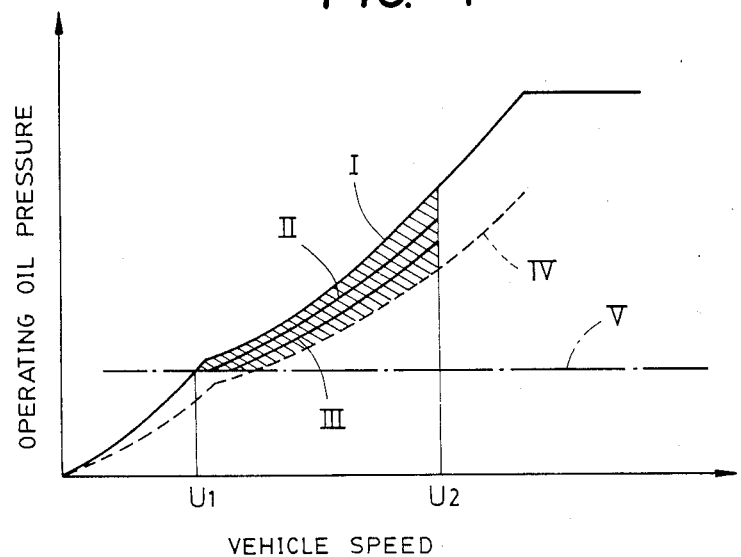
FIG. 4 is a graph showing the relationship between the operating oil pressure for the direct-coupling clutch and the vehicle speed.

That is, the modulated oil pressure Pc is equal to one $\alpha$th of the governor pressure Pg and can be represented e.g. by a characteristic curve indicated by the broken line IV in FIG. 4. By fully closing and fully opening the solenoid valve 81, the operating oil pressure for the direct-coupling clutch Cd can be selectively controlled to two or a higher level and a lower level as indicated by the solid line I and the broken line IV in FIG. 4. In addition, by controlling the duty ratio of the valve opening period of the solenoid valve 81, the operating oil pressure for the direct-coupling clutch Cd can be brought to any desired value between the two levels indicated by the solid line I and the broken line IV. Although the dependency of the operating oil pressure upon the throttle valve pressure Pt, i.e. the throttle valve opening, is omitted from the graph of FIG. 4, as mentioned before, in practice the throttle valve opening may be plotted along a coordinate extending at right angles to the coordinate axes of the modulated pressure Pc and the vehicle speed U in accordance with the output pressure characteristic of the modulator valve 60, i.e. the operating oil pressure for the direct-coupling clutch Cd, which increases in proportion to an increase in the throttle valve opening. In FIG. 4, the straight one-dot chain line V represents the internal pressure PT of the torque converter T, and the magnitude of engaging force of the direct-coupling clutch Cd is determined by the difference between the internal pressure PT and the operating oil pressure indicated by the solid line I, II, III or the broken line IV.

Figure 5A:
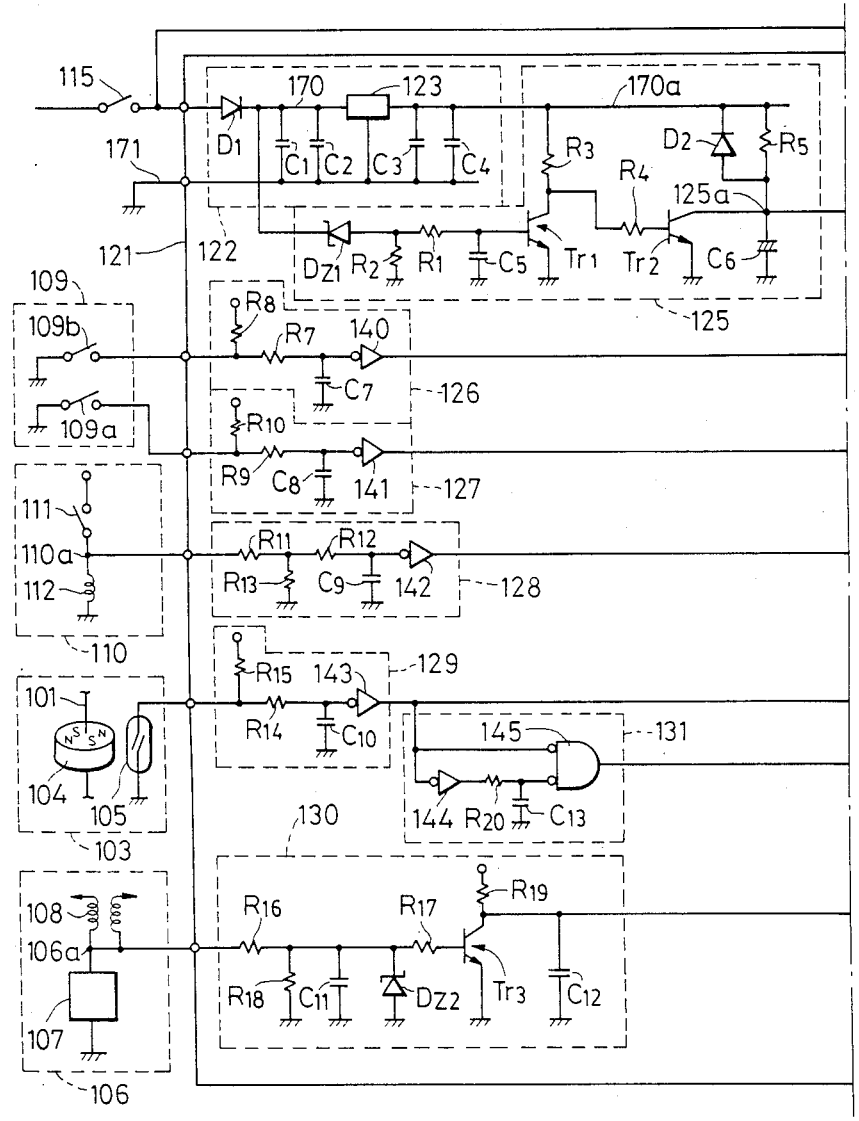

The control system 120 in FIG. 2 controls the opening and closing action of the solenoid valve 81, i.e. the switching action of the selector means 80, and comprises an electronic control circuit 121 which may be formed by a microcomputer, the aforementioned vehicle speed sensor 103, an engine rotational speed sensor 106, a shift lever position sensor 109, and sensors 110 for detecting the operative states of load-creating equipments such as air conditioner, defogger, headlights and wipers (hereinafter merely called "the air conditioner operation sensor 110"), details of which are shown in FIG. 5. The electronic control circuit 121 is responsive to signals indicative of values detected by the respective sensors 103, 106, 109, 110, to generate a control signal for energizing or deenergizing the solenoid 86 of the solenoid valve 81 in FIG. 2.

As shown in FIG. 5, the vehicle speed sensor 103 appearing in FIG. 1 comprises the aforementioned magnet 104 which may have a disk-like configuration with a plurality of, e.g. four, magnetic poles and secured to the speedometer cable 101 for rotation in unison therewith, and the reed switch 105 arranged in facing relation to the magnet 104 and adapted to be closed each time each magnetic pole of the magnet 104 encounters the reed switch 105, e.g. four times per rotation of the speedometer cable 101. The engine rotational speed sensor 106 comprises an igniter 107 and an ignition coil 108 as shown in FIG. 5, wherein a pulse signal is generated at a junction 106a between the igniter 107 and the ignition coil 108, which varies in frequency in response to a change in the rotational speed of the engine.

The shift lever position sensor 109 is connected to a manual shift lever, not shown, of the manual shift valve Vm and comprises two limit switches 109a and 109b, for instance. The limit switch 109a is adapted to be closed when the shift lever assumes the D3 drive range position, while the limit switch 109b is adapted to be closed when the shift lever assumes the D4 drive range position.

Although in the illustrated embodiment, the shift lever position sensor 109 employs limit switches, it may be formed by other switches such as reed switches, alternatively. Further, in lieu of detecting the shifted position of the shift lever, the valve body positions of the shift valves V2, V3 may alternatively be detected.

The air conditioner operation sensor 110 comprises, as shown in FIG. 5, a switch 111 for actuating the air conditioner, and a solenoid 112 of an electromagnetic clutch which drivingly connects the compressor of the air conditioner to the crankshaft of the engine. A signal indicative of on-state of the switch 111, i.e. the operative state of the air conditioner is generated at a junction 110a between the switch 111 and the solenoid 112, when the solenoid 112 is energized due to closing of the switch 111.

In FIG. 5, the electronic control circuit 121 comprises a constant-voltage power supply circuit 122, a reset pulse-generating circuit 125, input circuits 126-130, differentiation circuits 131, 132, an oscillating circuit 133, a central processing unit (hereinafter called "the CPU") 160, and an output circuit 161.

In the power circuit 122, a diode D1 has its anode connected to an ignition switch 115 and its cathode connected to a line 170. Capacitors C1 and C2 are connected in parallel between the line 170 and an earthing line 171, while capacitors C3 and C4 are connected in parallel between the earthing line 171 and a line 170a. A circuit element 123 for stabilizing the power voltage is arranged between the lines 170, 170a and connected to the line 171.

In the reset pulse-generating circuit 125, a Zener diode DZ1 has its cathode connected to the line 170 and its anode connected to the base of a transistor Tr1 through a resistance R1. A resistance R2 has one end grounded and the other end connected to a junction between the diode DZ1 and the resistance R1. The transistor Tr1 has its base grounded through a capacitor C5, its collector connected to the line 170a and the base of a transistor Tr2 through respective resistances R3 and R4, and its emitter grounded. The transistor Tr2 has its collector connected to a junction 125a between a resistance R5 and a capacitor C6 connected in series between the line 170a and the ground, and the junction point 125a is connected to a reset pulse input terminal RES of the CPU 160. A diode D2 is connected in parallel with the resistance R5.

In the input circuit 126, a resistance R7 has one end grounded through the limit switch 109b of the shift lever position sensor 109 and also connected to a power supply through a resistance R8, and has its other end connected to the input of an inverter 140 and also grounded through a capacitor C7. The inverter 140 has its output connected to an input terminal P10 of the CPU 160. When the limit switch 109b is open, that is, when the shift lever, i.e. the manual shift valve Vm, assumes a position other than the D4 drive range position, the input circuit 126 generates a low level output, while when the manual shift valve Vm assumes the D4 drive range position and accordingly the limit switch 109b is closed, it generates a high level output. The input circuit 127 has a circuit configuration substantially identical with that of the input circuit 126. A resistance R9 has one end connected to the limit switch 109a of the shift lever position sensor 109, and an inverter 141 has its output connected to an input terminal P11 of the CPU 160. The input circuit 127 generates a low level output when the manual shift valve Vm assumes a position other than the D3 drive range position, and generates a high level output when the manual shift valve Vm assumes the D3 drive range position.

In the input circuit 128, a resistance R11 has one end connected to the junction 110a of the air conditioner operation sensor 110 and has its other end connected to the input of an inverter 142 through a resistance R12. A resistance R13 is connected between the ground and the junction between the resistances R11, R12. The inverter 142 has its input grounded through a capacitor C9 and its output connected to an input terminal P12 of the CPU 160. The input circuit 128 generates a high level output when the switch 111 is open, and generates a low level output when the switch 111 is closed.

The input circuit 129 has a circuit configuration substantially identical with that of the input circuit 126. A resistance R14 has its one end connected to one end of the reed switch 105 of the vehicle speed sensor 103, while an inverter 143 has its output connected to an input terminal T0 of the CPU 160. The inverter 143, i.e. the input circuit 129, generates a low level output when the reed switch 105 is open, and generates a high level output when the same switch 105 is closed.

In the input circuit 130, a resistance R16 has its one end connected to the junction 106a of the engine rotational speed sensor 106 and its other end connected to the base of a transistor Tr3 through a resistance R17. A resistance R18, a capacitor C11 and a Zener diode DZ2 are connected in parallel between the ground and the junction between the resistances R16, R17. The transistor Tr3 has its collector connected to a power supply through a resistance R19 as well as to an input terminal T1 of the CPU 160, and also grounded through a capacitor C12. The input circuit 130 generates a low level output when the igniter 107 is open, and generates a high level output when the igniter 107 is closed.

In the differentiation circuit 131, a NOR circuit 145 has its one input terminal connected to the output of the input circuit 129, and its other input terminal connected through a resistance R20 and an inverter 144 to the output of the input circuit 129 and also grounded through a capacitor C13. The NOR circuit 145 has its output connected to one input terminal of a NOR circuit 149. In the differentiation circuit 132, a NOR circuit 148 has its one input terminal connected to the collector of the transistor Tr3 of the input circuit 130 through an inverter 146, and has its other input terminal connected through a resistance R21 and an inverter 147 to the output of the inverter 146 and also grounded through a capacitor C14. The NOR circuit 148 has its output connected to the other input terminal of the NOR circuit 149 which in turn has its output connected to an interrupt pulse input terminal INT of the CPU 160.

The differentiation circuits 131, 132 generate pulse signals with respective predetermined pulse durations, in response to the leading edges of the vehicle speed signal and the engine rotational speed signal from the input circuits 129, 130, respectively. When either one of the output signals from the differentiation circuits 131, 132 shows a high level, the NOR circuit 149 generates a low level output to interrupt the execution of a main program within the CPU 160.

In the oscillating circuit 133, a quartz oscillator 150 has its two terminals connected, respectively, to one terminals of capacitors C15 and C16 as well as to input terminals X1 and X2 of the CPU 160. The capacitors C15, C16 have their other terminals grounded. The oscillating circuit 133 supplies a clock pulse signal having a predetermined pulse repetition to the CPU 160.

The output circuit 161 is intended to actuate the solenoid valve 81 appearing in FIG. 2. A resistance R22 has its one end connected to an output terminal DB0 of the CPU 160 and its other end connected to the base of a transistor Tr4. The transistor Tr4 has its collector connected to one end of the solenoid 86 of the solenoid valve 81 and also grounded through a Zener diode DZ3, with its emitter grounded. The solenoid 86 has its other end connected to a contact of the ignition switch 115 permanently connected to the power circuit 122. The output circuit 161 energizes the solenoid 86 when the ignition switch 115 is closed and at the same time the transistor Tr4 conducts.

Figures 6, 6A:
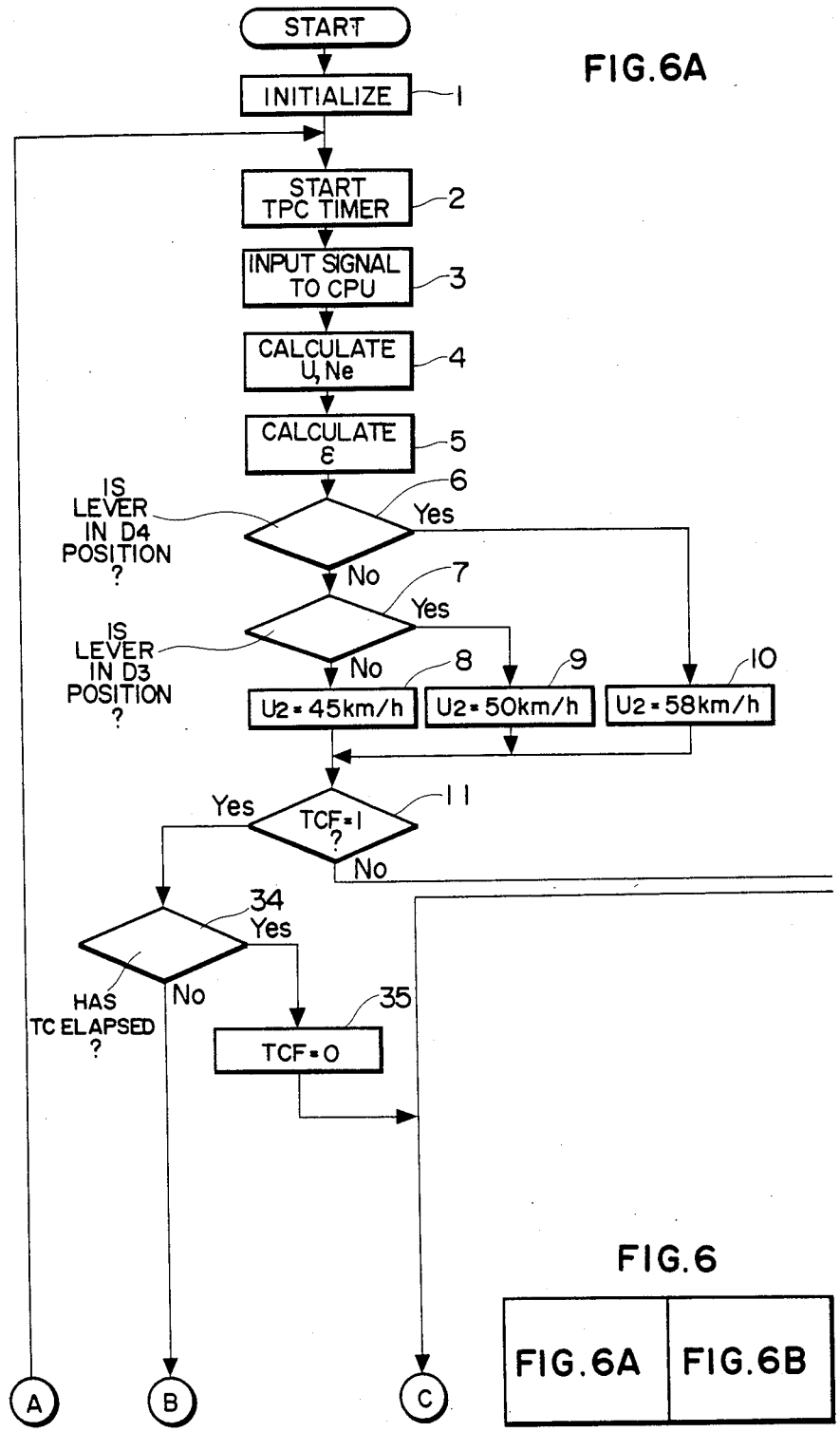
FIG. 6 is a composite of FIGS. 6A and 6B.
FIGS. 6A and 6B constitute part of a flowchart of a control program for controlling the operating oil pressure for the direct-coupling clutch.
Figure 6B:
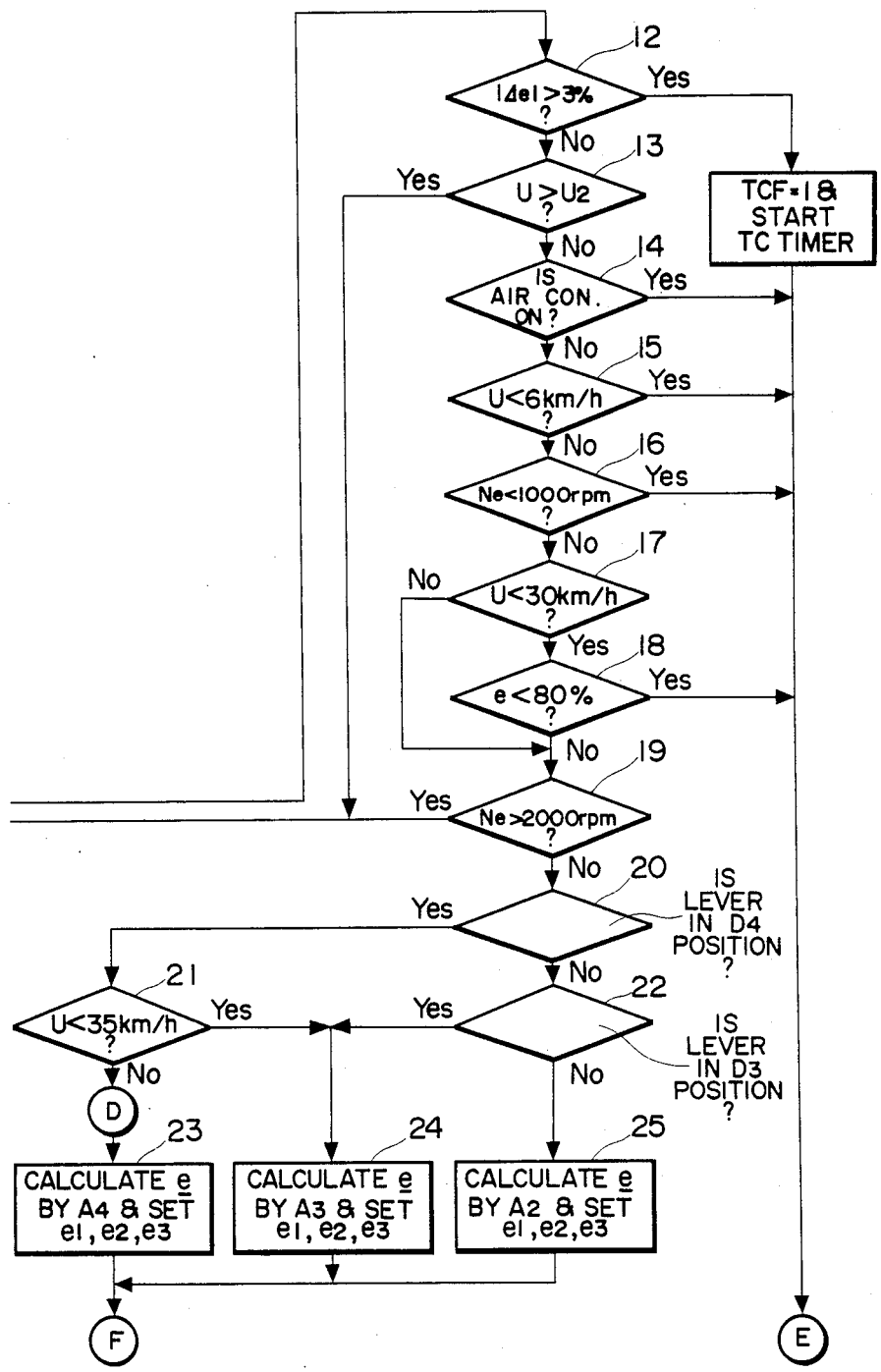

FIGS. 6 and 7 show flowcharts of a program for controlling the operating oil pressure for the direct-coupling clutch, which is executed by the CPU 160.

First, when the ignition switch 115 of the engine is closed to start the engine, the reset pulse-generating circuit 125 of the electronic control circuit 121 goes low so that the CPU 160 is reset to be initialized (step 1). Then, a TPC timer within the CPU 160 is started at step 2. The TPC timer serves to regulate the processing time of the whole control system, of which the set time TPC is set at a value larger than a maximum possible period of time required for the below-mentioned steps to be executed in any possible way, e.g. it is set at 20 msec. Various signals from the input circuits 126–130 are supplied to the CPU 160 in synchronism with the starting action of the TPC timer.

When the CPU 160 is supplied with a low level output from the NOR circuit 149 through its terminal INT, it operates to measure the time intervals of respective pulses of the vehicle speed signal and the engine speed signal supplied from the input circuits 129, 130 to thereby determine the vehicle speed U and the engine rotational speed Ne (step 4). Further, the CPU 160 operates on the determined values U and Ne to calculate a value $\epsilon$ for calculation of the speed ratio e between the input shaft 1 of the torque converter T and the output shaft 5 of same. The value $\epsilon$ is calculated in the following manner.

The speed ratio e of the torque converter T can be represented by an equation given below:

$$e = \frac{N2}{N_e} \tag{1}$$

where Ne represents the engine rotational speed, and N2 the rotational speed of the input shaft (main shaft) 5 of the transmission M, respectively.

Since the input shaft 5 and the speedometer cable 101 are connected with each other by means of gear trains, no slip can take place between these two members. Therefore, the rotational speed N2 of the input shaft 5 can be expressed as follows:

$$N2 = A \times N3 \tag{2}$$

where A represents the reduction ratio between the input shaft 5 and the speedometer cable 101 and N3 the rotational speed of the speedometer cable 101.

By substituting the equation (2) into the equation (1), the speed ratio e can be expressed as follows:

$$e = \frac{AN3}{N_e} \tag{3}$$

If the transmission M is a 4-speed change gear type, the value of the reduction ratio A can selectively assume values $A_1$–$A_4$ corresponding, respectively, to the reduction ratios for first speed to fourth speed.

If the both sides of the equation (3) are divided by the value A, the following equation is obtained:

$$\frac{e}{A} = \frac{N3}{N_e} = \epsilon \tag{4}$$

As noted before, the value $\epsilon$ is calculated from the engine rotational speed Ne and the rotational speed N3 of the speedometer cable 101.

A rotational speed sensor may be provided on the input shaft 5 of the auxiliary transmission M in order to sense the output rotational speed of the torque converter T.

After the value $\epsilon$ has been calculated at step 5, the program proceeds to step 6 wherein it is determined whether or not the shift lever of the manual shift valve Vm is in the D4 drive range position. If the answer is affirmative or Yes, the program proceeds to step 10 to make the below-mentioned setting, whereas if the answer is negative or No, the program proceeds to step 7 to determine whether or not the shift lever is in the D3 drive range position. If the answer to the step 7 is affirmative, that is, the shift lever is in the D3 drive range position, the program proceeds to step 9, whereas if the answer is negative, the program proceeds to step 8. According to the invention, an upper limit value U2 of the vehicle speed U below which control of the hydraulic oil pressure for the direct-coupling clutch Cd is to be effected in response to the speed ratio e is set to values dependent upon the position of the shift lever. If the shift lever is in the D4 drive range position as a result of the determination of step 6, the program proceeds to step 10 wherein the upper limit value U2 is set to 58 km/h, while if the shift lever is in the D3 drive range position as a result of the determination of step 7, the value U2 is set to 50 km/h at step 9, and if the shift lever is determined to be in the second-speed holding position at step 7, the value U2 is set to 45 km/h at step 8. After the upper limit value U2 of the vehicle speed U has been set to any one of the above values, the program proceeds to step 11 to determine whether or not a flag signal TCF for a TC timer, hereinafter referred to, assumes a value of 1. If the answer to step 11 is affirmative, the program proceeds to step 34, while if the answer is negative, the program proceeds to step 12.

At step 12, it is determined whether or not the difference $|\Delta e|$ between a speed ratio value e of the torque converter T obtained in the present loop and a speed ratio value e' obtained in the last loop is larger than a predetermined reference value, e.g. 3%, which has beforehand been calculated on the basis of the fourth speed reduction ratio $A_4$ ($|\Delta e| > 3\%$). As the predetermined reference value of the value Δe may be provided a plurality of such values respectively for the different positions of the shift lever. Alternatively, the predetermined reference value may be varied in dependence on a parameter which changes the operating state of the engine such as throttle valve opening.

If the answer to the question of step 12 is affirmative, that is, if the value |Δe| is larger than 3%, this means that the speed ratio e is now rapidly varying toward 1, and in such case the program proceeds to step 29 to start the TC timer to count the set time TC, while simultaneously setting the flag signal TCF value to 1 to indicate that the timer is operating, following by proceeding to step 33 in FIG. 7. In step 33, the CPU 160 sets the valve opening period TOUTC for the solenoid valve 81 to a predetermined value TLC0 (e.g. 60 msec). Thereafter, step 36 is executed to determine whether or not the set time period TPC for the TPC timer which has been started at step 2 as noted before, and upon the lapse of the set time period has elapsed, the program proceeds to step 37. In step 37, the CPU 160 produces a high level output through its output terminal DB0 over the valve opening period TOUTC set at step 33, to cause the transistor Tr4 in the output circuit 161 to conduct so that the solenoid 86 of the solenoid valve 81 is energized to open the valve 81. On this occasion, the pressure of operating oil supplied to the direct-coupling clutch Cd changes from a value on the solid line I in FIG. 4 to a value on the broken line IV to vary therealong.

Upon the lapse of the valve opening period TOUTC of the solenoid valve 81, the CPU 160 starts with the step 2 in FIG. 6 for execution of the program, i.e. again starts the operation of the TPC timer. Since the flag signal TCF has been set to 1 at step 29 in the last or immediately preceding loop, the answer to the question of step 11 should be affirmative, and then the program proceeds to step 34 to determine whether or not the set time period TC for the TC timer which has been started in the last loop has elapsed. If the set time period TC has not elapsed, the program proceeds to step 36 in FIG. 7 as in the last loop to see whether or not the set time period TPC of the TPC timer has elapsed, and upon the lapse of the same time period TPC, the solenoid valve 81 is energized to open over the same valve opening period as in the last loop. Until the set time period TC elapses, the steps 34, 36 and 37 are repeatedly executed, whereby the pressure of operating oil is maintained along the broken line IV in FIG. 4.

When the answer to the question of step 34 becomes affirmative upon the lapse of the set time period TC of the TC timer, the flag signal value TCF is set to zero at step 35, followed by execution of step 30 in FIG. 7 to set the valve opening period TOUTC for the solenoid valve 81 to a predetermined value TLC3 (e.g. 0 msec). Accordingly, no high level output is generated from the output terminal DBO of the CPU 160 so that the solenoid valve 81 is kept closed to hold the operating oil pressure at a value on the solid line I in FIG. 4. In this manner, when the speed ratio e of the torque converter T rapidly changes toward 1, the operating oil pressure is reduced over the set predetermined period TC to thereby reduce the engaging force of the direct-coupling force and accordingly reduce the speed ratio e. And then, immediately after the lapse of the predetermined period TC the solenoid valve 81 is controlled to be closed, thereby accurately controlling the speed ratio of the torque converter T within a required range, hereinafter referred to.

If the answer to the question of step 12 is negative, the program proceeds to step 13 to determine whether or not the vehicle speed U is higher than a value of the upper limit value $U_2$ set in one of the steps 8–10. If the answer is affirmative, the program proceeds to step 30 in FIG. 7 to cause the solenoid valve 81 to be closed to hold the operating oil pressure on the solid line I in FIG. 4. This is because at a vehicle speed above the upper limit value $U_2$ there is no fear of occurrence of vibrations of the vehicle body, and therefore it is then possible to increase the engaging force of the direct-coupling clutch Cd so as to prolong the life of the clutch and reduce the fuel consumption.

If the answer to the question of step 13 is negative, it is determined at step 14 whether or not the air conditioner is operating. If the answer to the question of step 14 is affirmative, the program proceeds to step 33 to reduce the engaging force of the direct-coupling clutch Cd. If the answer is negative, it is determined at step 15 whether or not the vehicle speed U is lower than the aforementioned lower limit value $U_1$ (=6 km/h). If the answer to the question of step 15 is negative, that is, if the vehicle speed is lower than 6 km/h so that direct coupling of the torque converter T cannot be effected, the program proceeds to step 33 to reduce the engaging force of the clutch Cd for prevention of engine stalling, whereas if the answer is negative, the program proceeds to step 16 to determine whether or not the engine rotational speed Ne is lower than a predetermined value, e.g. 1,000 rpm. That is, in a low engine speed region wherein the engine rotational speed Ne is lower than 1,000 rpm, there can occur large torque fluctuations, requiring torque amplification by the torque converter T. Therefore, if the answer to the question of step 16 is affirmative, the program proceeds to step 33 to reduce the engaging force of the direct-coupling clutch Cd so as not to spoil the torque-amplifying function of the torque converter T.

If the answer to the question of step 16 is negative, it is determined at step 17 whether or not the vehicle speed U is lower than a predetermined value, e.g. 30 km/h. If the answer to the question of step 17 is aifirmative, it is further determined at step 18 whether or not the speed ratio e of the torque converter T is smaller than a predetermined value, e.g. 80% in terms of the first speed reduction ratio $A_1$. That is, when the vehicle is started, the first speed reduction ratio is necessarily established such that there can occur large torque fluctuations, requiring the torque amplification by the torque converter T. Therefore, when the answers to the questions of steps 17 and 18 are both affirmative, it is judged that the vehicle is in a starting condition, and then the program proceeds to step 33 in FIG. 7 to reduce the engaging force of the direct-coupling clutch Cd.

If the answer to the question of either step 17 or step 18 is negative, the program proceeds to step 19 wherein it is determined whether or not the engine rotational speed Ne is higher than a predetermined value, e.g. 2,000 rpm. If the answer to this question is affirmative, the program proceeds to the aforementioned step 30 to increase the engaging force of the direct-coupling clutch Cd. That is, in an engine speed region above 2,000 rpm, there is no fear of occurrence of vibrations of the vehicle body and noise caused by the vibrations, permitting to increase the engaging force of the clutch to thereby reduce slippage of the torque converter T for curtailment of the fuel consumption.

If the answer to the question of step 19 is negative, it is determined at step 20 whether or not the shift lever position of the manual shift valve Vm is in the D4 drive range position. If the answer to this question is affirmative, it is determined at step 21 whether or not the vehicle speed U is lower than a predetermined value, e.g. 35 km/h, while if the answer at step 20 is negative, it is determined at step 22 whether or not the shift lever position is in the D3 drive range position.

According to the gist of the invention, in the light of rough control of the engaging force of the direct-coupling clutch Cd to a value appropriate to an operating condition in which the engine is operating by regulating the operating oil pressure by means of the throttle opening-responsive valve Vt and the governor valve Vg, the value of the speed ratio e is calculated by the use of a particular gear ratio at which vibrations of the vehicle body and noise caused by the vibrations are most likely to occur, and the calculated speed ratio e is controlled in a fine manner to a desired speed ratio range. Thus, the above phenomena of vehicle body vibrations and operating noise can be eliminated during running of the vehicle with gear ratios other than the above particular gear ratio.

Figure 8:
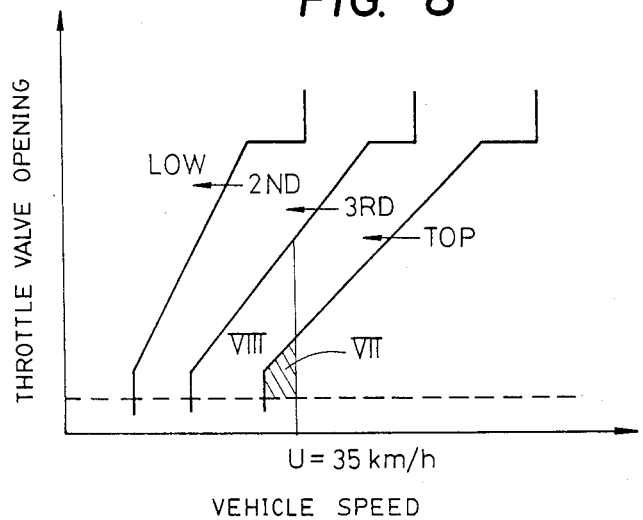
FIG. 8 is a graph showing several regions of the speed reduction ratio established by an auxiliary transmission appearing in FIG. 1, which are defined by the vehicle speed and the throttle valve opening indicative of the engine load.

In this connection, reference is made to FIG. 8 showing engine operating regions defined by the vehicle speed U and the throttle valve opening. In a region VII where the fourth speed (TOP) gear train G4 is established and the vehicle speed U is lower than 35 km/h for instance, it is desirable that the engaging force of the direct-coupling clutch Cd should be kept small since the engine rotational speed Ne is low. Further, the vehicle is not running in this region VII so frequently as in a region VIII wherein the third (3RD) speed gear train is established and the vehicle speed U is lower than 35 km/h for instance. Therefore, in view of the above gist of the invention, even when the vehicle is running in the D4 drive range position with the fourth (TOP) gear train established, it is more rational to calculate the vehicle speed ratio e by the use of the third speed gear ratio, if the vehicle speed U is then lower than 35 km/h for instance. Further, according to this manner, it is not necessary to determine which of the gear trains G1–G4 is then established, thereby making it possible to simplify the circuit configuration of the electronic control circuit and accordingly reduce the manufacturing cost. The same manner as above may apply to the case where the vehicle is running in the D3 drive range position with the third speed gear ratio established. Also in such case, it is more rational to calculate the speed ratio e by the use of the second speed gear ratio, when the vehicle speed U is then lower than 25 km/h for instance.

Therefore, according to the invention, if the answer to the question of step 20 is affirmative and simultaneously the answer to the question of step 21 is negative, that is, if the shift lever position is the D4 drive range position and simultaneously the vehicle speed U is higher than 35 km/h for instance, the CPU 160 regards that the auxiliary transmission M is in the fourth speed gear position, and executes the step 23 to calculate the speed ratio e by the use of the aforegiven equation (4) on the basis of the fourth speed reduction ratio A4, and at the same time sets a predetermined lower limit value e1 (e.g. 93%), a predetermined upper limit value e2 (e.g. 98%), and a predetermined medium value e3 (e.g. 96%). If the answers to the questions of steps 23 and 21 are both affirmative, that is, if the shift lever is in the D4 drive range position and simultaneously the vehicle speed U is lower than 35 km/h for instance, the CPU 160 regards that the auxiliary transmission M is in the third speed gear position, and executes the step 24 to calculate the speed ratio e according to the equation (4) on the basis of the third speed reduction ratio A3, and at the same time sets the above predetermined lower limit value e1 (e.g. 93%), upper limit value e2 (e.g. 98%), and medium value e3 (e.g. 96%). Also in the event that it is determined at step 22 that the shift lever is in the D3 shift position, the CPU 160 regards that the auxiliary transmission M is in the third speed gear position, and executes the step 24, while if it is determined at steps 20 and 22 that the shift lever is in neither the D4 drive range position nor the D3 drive range position, the CPU regards that the auxiliary transmission M is in the second-speed holding position, and executes the step 25 to calculate the speed ratio e on the basis of the second speed reduction ratio A2, and sets the predetermined lower limit value e1 (e.g. 93%), upper limit value e2 (e.g. 98%), and medium value e3 (e.g. 96%). The values e1–e3 may each be set at different values between the steps 23–25, i.e. according to the respective reduction speed ratios.

Then, the steps 26–28 in FIG. 7 are executed to determine which of the predetermined ranges e1–e3 the speed ratio e determined as above falls in. To be specific, it is determined at step 26 whether the speed ratio e is smaller than the predetermined lower limit value e1 (93%), at step 27 whether it is larger than the predetermined upper limit value e2 (98%), and at step 28 whether it is smaller than the predetermined medium value e3 (96%), respectively. When the speed ratio e is smaller than the predetermined lower limit value e1 (the answer to the quesiton of step 26 is affirmative), the program proceeds to the aforementioned step 30 to set the valve opening period TOUTC of the solenoid valve 81 to zero. That is, when the speed ratio e is smaller than the predetermined lower limit value e1, the operating oil pressure is controlled to lie along the solid line I in FIG. 4 so as to increase the engaging force of the direct-coupling clutch Cd to thereby increase the speed ratio e. On the contrary, if the speed ratio e is larger than the predetermined upper limit value e2 (the answer to the question of step 27 is affirmative), the program proceeds to the aforementioned step 33 to set the valve opening period TOUTC of the solenoid valve 81 to the aforementioned predetermined value TLC0 (60 msec), so that the operating oil pressure lies along the broken line IV in FIG. 4 so as to reduce the engaging force of the direct-coupling clutch Cd and accordingly reduce the speed ratio e.

If the speed ratio e shows a value between the predetermined lower value e1 and the predetermined lower value e2, the valve opening period TOUTC of the solenoid valve 81 is set to one of values explained hereinbelow, so that the operating oil pressure lies along a desired line interposed between the solid line I and the broken line IV in FIG. 4 so as to maintain the speed ratio e between the two predetermined values e1, e2. That is, if the speed ratio e is larger than the predetermined lower limit value e1 but smaller than the predetermined medium value e3 (the answers to the questions of the steps 26 and 27 are both affirmative but the answer to the question of step 28 is negative), the valve opening period TOUTC of the solenoid valve 81 is set to a predetermined value TLC2 (e.g, 20 msec) which is larger than the aforementioned predetermined value TLC3 (0 msec) but smaller than the predetermined value TLC0 (60 msec), at step 31. When it is determined at step 36 that the set time period TPC of the TPC timer has elapsed, the CPU 160 generates a high level output through its output terminal DB0 for a period of time (20 msec) corresponding to the predetermined value TLC2 to cause conduction of the transistor Tr4 of the output circuit 161 to energize the solenoid 86 and accordingly open the solenoid valve 81 (step 37). On the other hand, if the speed ratio e is larger than the predetermined medium value e3 but smaller than the predetermined upper limit value e2 (the answers to the questions of the steps 27, 28 are both negative), the valve opening period TOUTC is set to a predetermined value TLC1 (e.g. 40 msec) which is larger than the predetermined value TLC2 but smaller than the predetermined value TLC0, at step 32. Upon the lapse of the set time period TPC determined at step 36, the CPU 160 executes the step 37 to cause the solenoid valve 81 to open for a period of time (40 msec) corresponding to the predetermined value TLC1.

When the solenoid valve 81 is opened for the period of time corresponding to the predetermined value TLC2, the operating oil pressure is held along the solid line II in FIG. 4, while when the valve is opened for the period of time corresponding to the predetermined value TLC1, the operating oil pressure is held along the line III in FIG. 4.

Although in the above described embodiment the engaging force of the direct-coupling clutch Cd is controlled in four steps, this is not limitative, but it may be controlled in a continuous or stepless manner by varying the valve opening period TOUTC of the solenoid valve 81 in a continuous manner, for example. Furthermore, the valve opening period TOUTC of the solenoid valve 81 may be controlled by means of a combination of proportional term control responsive to the difference between the actual speed ratio e and a desired value thereof and integral term control responsive to the lapse of time and the engine rotational speed Ne.

When the temperature of the operating oil is low, the flow resistance through the check valve 36 and the oil cooler 37 increases, and accordingly the internal pressure of the torque converter T increases. Consequently, there is no fear that the engaging force of the direct-coupling clutch Cd becomes too large even when a load-creating device such as the air conditioner is operating, thus making it unnecessary to control the speed ratio e. In view of this, the propram may be so arranged as to detect temperature representative of the temperature of operating oil, for instance, the temperature of the engine cooling water, and execute the step 30 in FIG. 7 to set the valve opening period TOUTC of the solenoid valve 81 to zero to hold the valve 81 closed if the detected engine cooling water temperature is lower than a predetermined value. That is, when the operating oil temperature is low, the control of the valve opening period of the solenoid valve 81 may be omitted.

Further, although in the above described embodiment the speed ratio e ($=N_2/N_e$) between the input shaft 1 of the torque converter T and the output shaft 5 thereof is determined by the use of the equation (1), and the speed ratio e is controlled so as to fall within the predetermined range e1-e2, alternatively the speed difference $N_e-N_2$ may be determined in lieu of the speed ratio e, and the same speed difference may be controlled so as to fall within a predetermined range.

Figure 9:
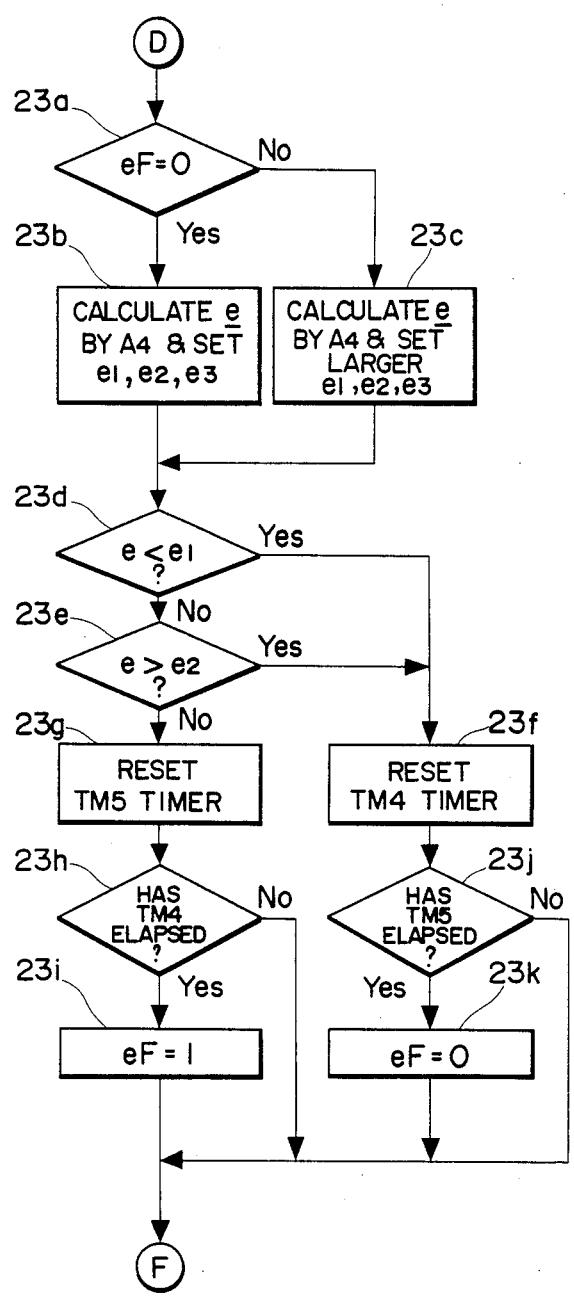
FIG. 9 is a modification of part of the program shown in FIG. 6.

FIG. 9 shows a variation of part of the program of FIGS. 6 and 7 corresponding to the entry points D-F thereof. The program of FIG. 9 is executed when in the steps 20 and 21 of FIG. 6, the shift lever of the manual shift valve Vm is in the D4 drive range position and simultaneously the vehicle speed U is higher than 35 km/h.

In step 23a of FIG. 9, it is determined whether or not a flag signal eF assumes a value of 0. The value of the flag signal eF is set to 1 when the speed ratio e with the fourth speed gear position established remains within a speed ratio range e1-e2 set in step 23b or step 23c, hereinafter referred to, over a predetermined period of time, e.g. 1 sec., while it is set to 0 when the same speed ratio e remains outside the predetermined range e1-e2 over a predetermined period of time, e.g. 3 sec.

If the answer to the question of step 23a is affirmative, the program proceeds to step 23b to calculate the speed ratio e by the use of the fourth speed reduction ratio A4 and sets a predetermined lower limit value e1 ($=93\%$), predetermiend upper limit value e2 ($=98\%$), and predetermined medium value e3 ($=96\%$), which determine a predetermined speed ratio range, as in the step 23 in FIG. 6. Thereafter, steps 23d and 23e are executed to determine whether or not the speed ratio e falls within the set speed ratio range e1-e2. To be specific, it is determined at step 23d whether or not the speed ratio e is smaller than the lower limit value e1, and at step 23e whether or not the speed ratio is larger than the upper limit value e2, respectively.

If either 23d or step 23e provides an affirmative answer, that is, if the speed ratio e falls outside the set predetermined range e1-e2, the program proceeds to step 23f to reset a TM4 (1 sec) timer, hereinafter referred to, and then to step 23j. In the step 23j, a determination is made as to whether or not the speed ratio e has continued to be outside the predetermined range e1-e2 over a predetermined period of time TM5 (e.g. 3 sec), by the use of a TM5 (3 sec) timer which is started to count from the time the speed ratio e drops below the lower limit value e1 or exceeds the upper limit value e2. When the speed ratio e has continually remained outside the predetermined range e1-e2 over the predetermined period of time TM5, step 23k is executed to set the flag signal eF to zero again. In such event, in the next loop, the determination at the step 23a results in reexecution of the step 23b to again set lower and upper limit values e1, e2, and medium value e3 which are equal to those set in the preceding loop. However, if the speed ratio e thus falls outside the predetermined range e1-e2, the step 30 or the step 33 in FIG. 7 is executed to increase or decrease the engaging force of the direct-coupling clutch Cd so that the speed ratio e is brought into the predetermined range e1-e2 set at step 23b. Then, the answers to the steps 23d, 23e are both negative, so that the step 23g is executed. In the step 23g, the TM5 (3 sec) timer is reset, and it is determined at step 23h whether or not the speed ratio e has remained within the predetermined range e1-e2 over a predetermined period of time TM4 (e.g. 1 sec), by the use of the TM4 (1 sec) timer which is started to count from the time the speed ratio e is brought into the predetermined range e1-e2. If the predetermined period of time TM4 has not elapsed as a result of the determination of step 23h, the program skips step 23i and proceeds to the step 26 in FIG. 7, whereas when the predetermined period of time TM4 has elapsed, the step 23i is executed to set the flag signal eF to 1.

When the flag signal eF has thus been set to 1, the answer to the question of the step 23a becomes negative, and then the program proceeds to step 23c to calculate the speed ratio e by the use of the fourth speed reduction ratio A4, and set a predetermined speed ratio range whose upper, lower limit values and medium value are larger than respective ones of the predetermined range set at step 23b. For instance, the lower limit value e1 is set to 96%, the upper limit value e2 to 99%, and the medium value e3 to 98%, respectively. By the use of the new predetermined speed ratio range e1-e2 thus set, the steps 23d-23k are executed to effect determinations and setting of the flag signal eF value in the above described manner. The lower limit value e1, upper limit value e2, and medium value e3 set at step 23b or at step 23c are applied to control of the operating oil pressure for control of the speed ratio e at steps 26 through 37 in FIG. 7.

The ground for selectively setting two speed ranges in dependence on the manner of change of the speed ratio e when the shift lever is in the D4 drive range position and the vehicle speed U is higher than 35 km/h as above is as follows: As stated before, the engaging force of the direct-coupling clutch Cd is controlled in a rough manner to a value appropriate to the operating condition of the engine by regulating the operating oil pressure by means of the throttle valve opening-responsive valve Vt and the governor valve Vg. And, by detecting the actual speed ratio e and controlling same so as to fall within the set predetermined range, the engaging force of the direct-coupling clutch Cd can be controlled with high accuracy. However, this accurate control of the engaging force of the direct-coupling clutch based upon speed ratio e is possible only when the operating oil temperature assumes a specific predetermined value and the vehicle is in a steady cruising condition. Therefore, when the operating oil temperature is different from the specific predetermined value or when the vehicle is running up a very gentle slope, it can happen that the speed ratio e cannot be controlled into the predetermined range. Therefore, according to the invention, on the above occasions, the speed ratio e is temporarily set to a higher value range than the required predetermined range, so as to permit subsequent control of the speed ratio e to the latter or required predetermined range.

Although in the above described variation two predetermined ranges are provided for the speed ratio e for selection during operation in the fourth speed gear position, this is not limitative, but alternatively two such predetermined ranges may be provided for selection during operation in the third speed gear position.

FIG. 10 shows a variation of part of the routine of FIG. 7 corresponding to the steps 26 through 28 and steps 30 through 33 (between the entry points F-G). In FIG. 10, the steps 26 and 27 correspond, respectively, to the steps 26 and 27 in FIG. 7 for determining whether or not the speed ratio e falls within a set range e1-e2. When it is determined at step 26 that the speed ratio e is smaller than the lower limit value e1, the program proceeds to step 30 to set the valve opening period TOUTC of the solenoid valve 81 to a predetermined value, e.g. zero to increase the engaging force of the direct-coupling clutch Cd, as in the same manner in FIG. 7. When it is determined at step 27 that the speed ratio e is larger than the upper limit value e2, the program proceeds to step 33 to set the valve opening period TOUTC to a predetermined period of time TLC0 (e.g. 60 msec) to decrease the engaging force of the clutch Cd for reduction of the speed ratio e. When the speed ratio e falls within the set predetermined range e1-e2 as a result of the determinations of steps 26, 27, the program proceeds to step 28' to determine whether or not in the last loop the solenoid 86 of the solenoid valve 81 was energized, that is, the valve opening period TOUTC was set to the predetermined value TLC0. When the solenoid 86 was energized in the last loop, the step 33 is continually executed also in the present loop to reduce the engaging force of the direct-coupling clutch Cd. On the other hand, if the solenoid 86 was in a deenergized state in the last loop, the step 30 is continually executed also in the present loop to thereby increase the engaging force of the clutch Cd.

The control unit 120 in FIG. 3 operates in accordance with the above described program to drive the selector means 80 to selectively supply the direct-coupling clutch Cd with higher operating oil pressure along the solid line I in FIG. 4 and lower operating oil pressure along the broken line IV. By setting two different values of the engaging force of the direct-coupling clutch Cd obtained by operating oil pressures along the solid line I and the broken line IV in FIG. 4 to values close to each other, shocks upon the changeover action can be minimized, thereby avoiding spoilage of the comfortable driving feeling.

FIG. 11 illustrates a second embodiment of the invention. The oil pressure in the second pilot pressure chamber 66 of the modulator valve 60 is varied, selectively, to a higher level and a lower level, respectively, by fully opening and fully closing the solenoid valve 81 of a selector means 80A, to thereby vary the operating oil pressure in the fluid line 71 in two steps. To this end, the drain line 82 with the restriction 84 therein is connected to the second pilot pressure chamber 66. In FIG. 11 as well as FIGS. 12, 14, 16 and 17 illustrating further embodiments of the invention, parts and elements substantially the same in operation and function with those in FIG. 1 are designated by identical reference characters, for the convenience of understanding.

According to the embodiment of FIG. 11, as the solenoid valve 81 opens, a reduced oil pressure is applied to the second pilot pressure chamber 66 to move the valve body 64 into its open position, thereby increasing the operating oil pressure in the fluid line 71. That is, the modulator valve 60 in FIG. 11 operates in a manner reverse to that of the first embodiment with respect to opening and closing of the valve 81. In this embodiment, therefore, the control system 120 is adapted to supply a control signal to the selector means 80A in a manner reverse to that of the first embodiment. For instance, in the steps 30 to 33 in FIG. 7, the valve opening period value TOUTC of the solenoid valve 81 is set to the predetermined value TLU0 (60 msec) at step 30, TLU1 (40 msec) at step 31, TLU2 (20 msec) at step 32, and TLU3 (0 msec) at step 33, in lieu of TLU3 (0 msec), TLU2 (20 msec), TLU1 (40 msec), and TLU3 (0 msec), respectively, applied in the first embodiment.

Figure 13:
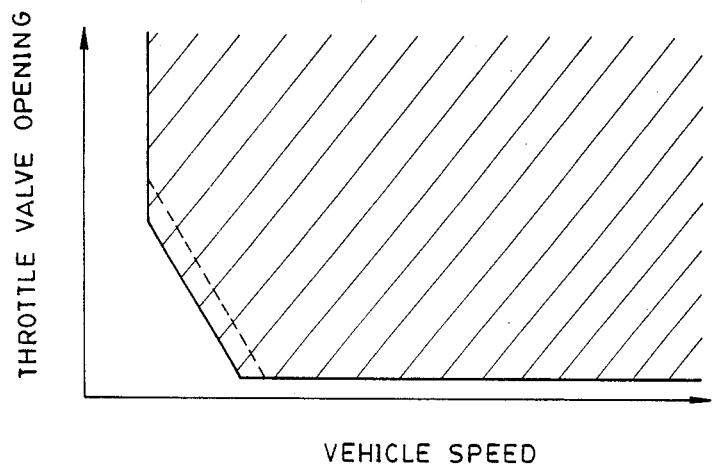
FIG. 13 is a graph showing an operable region of the direct-coupling clutch defined by the vehicle speed and the throttle valve opening.

FIG. 12 shows a third embodiment of the invention, wherein the throttle pressure Pt acting upon the third pilot pressure chamber 69 of the modulator valve 60 is varied, selectively, to a higher level and a lower level by means of a selector means 80B. That is, the throttle pressure Pt is applied to the third pilot pressure chamber 69 through a branch fluid line 48' with the restriction 83 therein and branching off from the pilot fluid line 48, and the drain line 82 is connected to the third pilot pressure chamber 69. Also with the arrangement according to this embodiment, the engaging force of the direct-coupling clutch Cd can be controlled in two steps by fully opening and fully closing the solenoid valve 81. Besides, this arrangement is particularly advantageous when applied to a vehicle equipped with an engine of small piston displacement, wherein the throttle valve is opened to a relatively large degree during cruising of the vehicle, or to a vehicle of an economical type wherein the highest-speed gear ratio is relatively small. When an auxiliary equipment installed in such a vehicle and driven by the engine, such as an air conditioner, is operated to apply load on the engine, the throttle valve opening has to be increased so as to maintain the cruising speed at a constant value, causing an increase in the throttle pressure Pt, i.e. an increase in the engaging force of the direct-coupling clutch Cd. Therefore, according to the third embodiment of the invention, when it is determined that the air conditioner is operating, that is, when the determination at the step 14 in FIG. 6 is affirmative, the operating oil pressure for the direct-coupling clutch Cd is controlled in a manner dependent on the throttle valve opening, as stated before, to thereby prevent the engaging force of the direct-coupling clutch Cd from becoming too large due to operation of the air conditioner. More specifically, the governor pressure Pg applied to the first pilot pressure chamber 65 of the modulator valve 60 and the throttle pressure Pt applied to the third pilot pressure chamber 69 act upon the valve body 64 to displace same toward its open position. Therefore, as the throttle pressure Pt in the third pilot pressure chamber 69 decreases, correspondingly decreased output oil pressure is delivered to the fluid line 63, whereby the operative region of the direct-coupling clutch Cd, hatched in FIG. 13, becomes narrower in response to the operation of the air conditioner, as indicated by the broken line in the same figure. That is, the operation of the air conditioner requires the accelerator pedal to be stepped on to a greater degree by an amount corresponding to the load applied by the air conditioner. The modulator valve 60 acts to compensate for an increase in the engaging force of the direct-coupling clutch Cd caused by the increased stepping amount of the accelerator pedal, thereby maintaining the engaging force of the direct-coupling clutch Cd generally constant during low and medium speed cruising of the vehicle irrespective of whether or not the air conditioner is operated.

Figure 15:
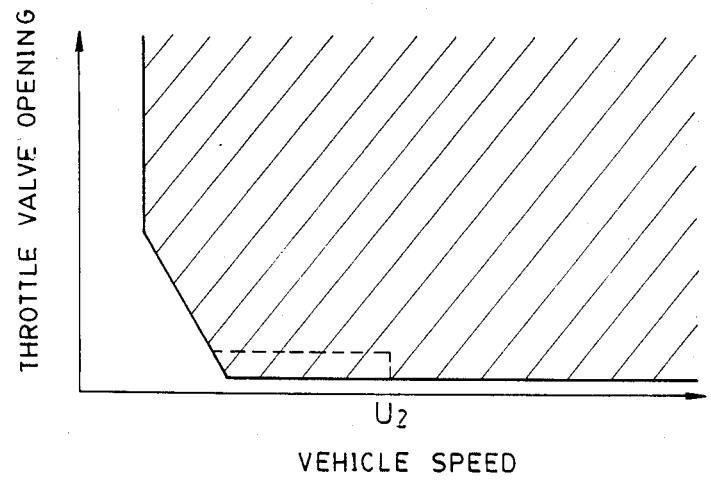
FIG. 15 is a graph similar to FIG. 13, showing an operable region of the direct-coupling clutch, according to the fourth embodiment of the invention.
Figure 14:
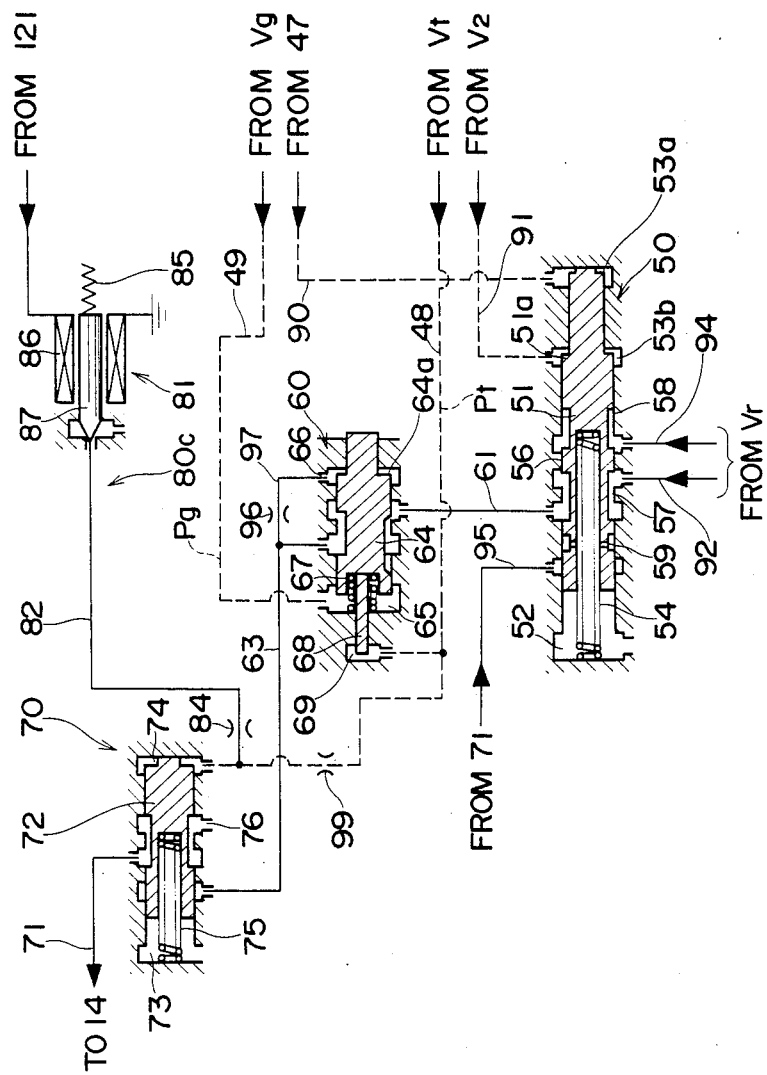
FIG. 14 is a circuit diagram of essential part of the hydraulic control system, according to a fourth embodiment of the invention.

The control system Dc may be so arranged that the engaging force of the direct-coupling clutch Cd is controlled to zero during operation of the air conditioner while the vehicle is cruising with a small throttle valve opening. To this end, in lieu of controlling the pilot pressure to be applied to the third pilot pressure chamber 69 of the modulator valve 60 in the third embodiment, the throttle pressure Pt to be applied to the second pilot pressure chamber 74 of the idle release valve 70 may alternatively be controlled, as shown in FIG. 14 illustrating a fourth embodiment of the invention. More specifically, in FIG. 14, the second pilot pressure chamber 74 of the idle release valve 70 is connected to the pilot fluid line 48 through a restriction 99 forming a component element of the selector means 80C, and the drain line 82 with the restriction 84 therein is connected to the pilot fluid line 48 at a location downstream of the restriction 99. With this arrangement, when the solenoid valve 81 is open, the oil pressure to be applied to the second pilot pressure chamber 74 is modulated to a value dependent on the cross-sectional areas of the two restrictions 84, 99. If the restrictions 84, 99 have the same cross-sectional area, for instance, the second pilot pressure chamber 74 is supplied with an oil pressure equal to half of the throttle pressure Pt. Therefore, when the solenoid valve 81 is open, it is necessary to step on the throttle pedal to a degree twice as large as a value assumed when the solenoid valve is closed, to open the idle release valve 70. Therefore, according to the arrangement of FIG. 14, by opening the solenoid valve 81 upon detecting the operation of the air conditioner, the operative region of the direct-coupling clutch Cd, hatched in FIG. 15, can be narrowed as indicated by the broken in the same figure. In this manner, the operative region of the direct-coupling clutch Cd can exclude regions wherein vibrations of the engine can easily occur, i.e. regions where the vehicle is cruising with a throttle valve opening at low and medium speeds. This control of the engaging force of the direct-coupling clutch Cd should be carried out when the vehicle speed is below the aforementioned predetermined value U2, that is, when the determination at the step 13 in FIG. 6 provides a negative answer, because vibrations of the engine can easily occur in low and medium speed regions and such control is particularly required in these regions.

Figure 16:
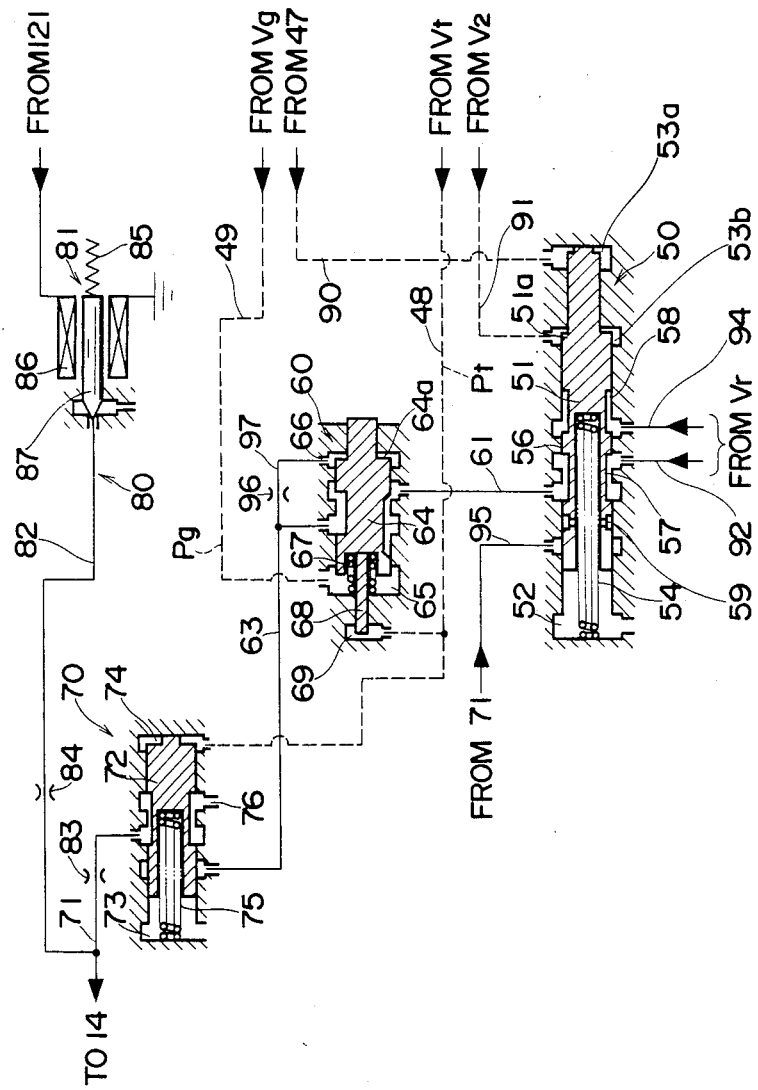
FIG. 16 is a circuit diagram of essential part of the hydraulic control system of the control system, according to a fifth embodiment of the invention.

FIG. 16 illustrates a fifth embodiment of the invention. According to this embodiment, the restriction 83 is arranged in the fluid line 71, and the drain line 82 with the restriction 84 therein is connected to the fluid line 71 at a location downstream of the restriction 83. Unlike the foregoing embodiments which are adapted to control the pilot pressure such as the throttle pressure Pt and the governor pressure Pg for control of the engaging force of the direct-coupling clutch Cd, the device of this embodiment is adapted to control the drainage of pressurized oil from the fluid line 71 for controlling the engaging force in two steps, in response to full opening and full closing of the solenoid valve 81.

Figure 17:
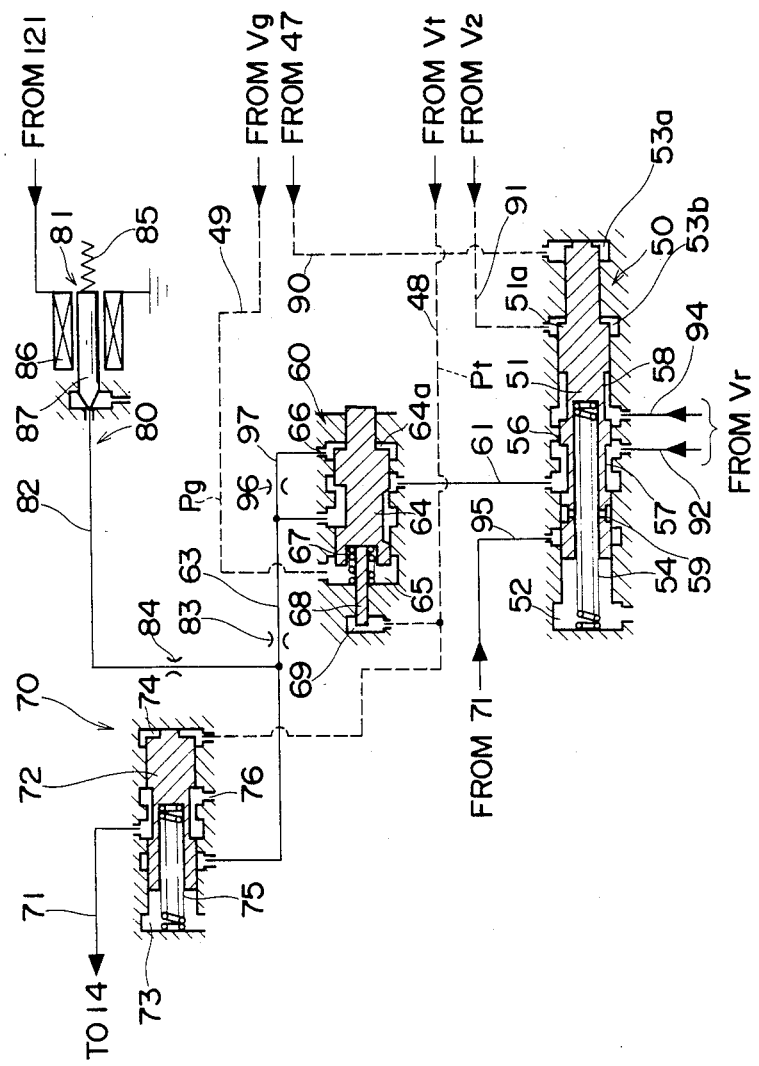
FIG. 17 is a circuit diagram of essential part of the hydraulic control system, according to a sixth embodiment of the invention.

FIG. 17 shows a sixth embodiment of the invention, wherein the restriction 83 is arranged in the fluid line 63 connecting the modulator valve 60 with the idle release valve 70, and the drain line 82 with the restriction 84 therein is connected to the fluid line 63 at a location downstream of the restriction 83. Like the fifth embodiment, by draining part of pressurized oil to be applied to the direct-coupling clutch Cd, the engaging force of the direct-coupling clutch Cd is controlled in two steps in response to full opening and full closing of the solenoid valve 81.

According to one of conventionally proposed methods for controlling the engaging force, the driver is allowed to choose at will either economical driving of the vehicle or driving with improved driveability free of unpleasant vibrations of the vehicle body and vibration noise, by manually operating a switch provided near his seat to selectively set the vehicle speed to two different values below which locking-up of the torque converter T through direct coupling of the clutch Cd can take place. However, this proposed method has the disadvantage that when the vehicle speed below which locking-up of the clutch can take place is set to one of the different values, by manually operating the switch, no slip can be obtained in the clutch when the vehicle speed is above the set value.

To eliminate this disadvantage when the proposed method is applied to the control system of the present invention, a manual switch Sw may be provided between the solenoid valve 81 and the electronic control circuit 120, as shown in FIG. 2, so that the driver can manually control the operation of the solenoid valve 81 through the switch Sw at his seat. The manual switch Sw has two contacts 116 and 117, the contact 116 being connected to the electronic control circuit 120, and the contact 117 to a circuit 118 which always generates a signal for energizing the solenoid 86 of the solenoid valve 81. By the provision of the manual switch Sw, the engaging force of the direct-coupling clutch Cd can be selected to two different levels at the driver's will, to thereby obtain a desired degree of locking-up of the torque converter T.

Although the foregoing embodiments employ a hydraulic torque converter as the hydraulic power transmission, the present invention may be applied to any transmissions for automotive vehicles provided with other types of hydraulic power transmissions (fluid couplings).

What is claimed is:

1. In a transmission for an automotive vehicle, including a hydraulic power transmission means having an input member and an output member, a direct-coupling mechanism having a hydraulically operating portion and arranged between said input and output members, said direct-coupling mechanism being operable to mechanically engage said input and output members with each other with an engaging force corresponding to the magnitude of an operating fluid pressure applied to said hydraulically operating portion, an operating fluid source, and operating fluid pressure regulating means arranged between said operating fluid source and said hydraulically operating portion of said direct-coupling mechanism for regulating the operating fluid pressure to be applied to said hydraulically operating portion, a control system for controlling said direct-coupling mechanism, comprising: vehicle speed sensor means for detecting the speed of said vehicle; slip sensor means for detecting the value of a parameter indicative of an amount of relative slip between said input and output members; and control means which controls said operating fluid pressure regulating means to vary the magnitude of the operating fluid pressure so that said parameter falls within a predetermined range, when the vehicle speed detected by said vehicle speed sensor means falls between a first predetermined value and a second predetermined value larger than said first predetermined value and at the same time the value of said parameter detected by said slip sensor means is outside said predetermined range.

2. A control system as claimed in claim 1, wherein said control means causes said operating fluid pressure regulating means to decrease the operating fluid pressure, when said parameter shows a value outside said predetermined range and indicative of a smaller amount of relative slip between said input and output members with respect to predetermined values determining said predetermined range, to thereby decrease the engaging force of said direct-coupling mechanism.

3. A control system as claimed in claim 1, wherein said control means causes said operating fluid pressure regulating means to increase the operating fluid pressure, when said predetermined parameter shows a value outside said predetermined range and indicative of a larger amount of relative slip between said input and output members with respect to predetermined values determining said predetermined range, to thereby increase the engaging force of said direct-coupling mechanism.

4. A control system as claimed in any of claim 1, 2, or 3, wherein said parameter comprises the ratio in rotational speed between said input and output members.

5. A control system as claimed in any of claim 1, 2, or 3, wherein said parameter comprises the difference in rotational speed between said input and output members.

6. In a transmission for an automotive vehicle, including hydraulic power transmission means having an input member and an output member, said input member being connected to an internal combustion engine, a direct-coupling mechanism having a hydraulically operating portion and arranged between said input and output members, said direct-coupling mechanism being operable to mechanically engage said input and output members with each other with an engaging force corresponding to the magnitude of an operating fluid pressure applied to said hydraulically operating portion, an operating fluid source, operating fluid pressure regulating means arranged between said operating fluid source and said hydraulically operating portion of said direct-coupling mechanism for regulating the operating fluid pressure applied to said hydraulically operating portion, and an auxiliary transmission connected to said output member of said hydraulic power transmission means and having a plurality of gear trains for providing respective different gear ratios, said auxiliary transmission having selector means for forming a plurality of combinations of said gear trains and operable at human will to select one of said combinations, a control system for controlling said direct-coupling mechanism, comprising: vehicle speed sensor means for detecting the speed of said vehicle; rotational speed ratio sensor means for detecting the ratio between the rotational speed of said output member and that of said input member; and control means which controls said operating fluid pressure regulating means to increase the operating fluid pressure so that said direct-coupling mechanism applies a first engaging force to said input and output members, when the vehicle speed detected by said vehicle speed sensor means falls between a first predetermined value and a second predetermined value larger than said first predetermined value and at the same time the rotational speed ratio detected by said rotational speed ratio sensor means is smaller than a predetermined lower limit value, said control means adapted to control said operating fluid pressure regulating means to decrease the operating fluid pressure so that said direct-coupling mechanism applies a second engaging force smaller than said first engaging force to said input and output members, when the vehicle speed detected by said vehicle speed sensor means falls between a first predetermined value and a second predetermined value larger than said first predetermined value and at the same time the rotational speed ratio detected by said rotational speed ratio sensor means is larger than a predetermined upper limit value, to thereby control the rotational speed ratio between said input and output members so as to fall within a range determined by said predetermined upper and lower limit values.

7. A control system as claimed in claim 6, wherein said control means causes said operating fluid pressure regulating means to vary the operating fluid pressure so that said direct-coupling mechanism continually applies one of said first and second engaging forces to said input and output members, from the time said operating fluid pressure regulating means varies the operating fluid pressure to cause said direct-coupling mechanism to apply the one of said first and second engaging forces to the time said operating fluid pressure regulating means varies the operating fluid pressure to cause said direct-coupling mechanism to apply the other one of said first and second engaging forces to said input and output members.

8. A control system as claimed in claim 6, wherein said control means causes said operating fluid pressure regulating means to vary the operating fluid pressure so that said direct-coupling mechanism applies a medium engaging force intermediate between said first and second engaging forces to said input and output members, when the rotational speed ratio between said input and output members falls between said predetermined upper and lower limit values.

9. A control system as claimed in claim 6, wherein said control means causes said operating fluid pressure regulating means to increase the operating fluid pressure so that said direct-coupling mechanism applies said first engaging force to said input and output members, irrespective of the detected value of the rotational speed ratio between said input and output members, when the vehicle speed detected by said vehicle speed sensor means is larger than said second predetermined value.

10. A control system as claimed in claim 6, wherein said control means causes said operating fluid pressure regulating means to decrease the operating fluid pressure so that said direct-coupling mechanism applies said second engaging force to said input and output members, irrespective of the detected value of the rotational speed ratio between said input and output members, when the vehicle speed detected by said vehicle speed sensor means is smaller than said first predetermined value.

11. A control system as claimed in any of claim 6 or 9, including shift position sensor means for detecting a combination of said gear trains selected by said selector means, and wherein said second predetermined value of the vehicle speed is set to a value dependent on the combination of said gear trains detected by said shift position sensor means.

12. A control system as claimed in claim 11, wherein the larger value said second predetermined value of the vehicle speed is set to, the smaller gear ratio the combination of said gear trains detected by said shift position sensor means has.

13. A control system as claimed in claim 6, including shift position sensor means for detecting a combination of said gear trains selected by said selector means, and engine rotational speed sensor means for detecting the rotational speed of said engine, and wherein said rotational speed ratio sensor means detects the rotational speed ratio between said input and output members on the basis of the vehicle speed detected by said vehicle speed sensor means, the combination of said gear trains detected by said shift position sensor means, and the rotational speed of said engine detected by said engine rotational speed sensor means.

14. A control system as claimed in claim 13, wherein when the vehicle speed detected by said vehicle speed sensor means falls between said second predetermined value and a third predetermined value larger than said first predetermined value, the rotational speed ratio between said input and output members is detected on the basis of the smallest one of gear ratios which are provided by the combination of said gear trains detected by said shift position sensor means.

15. A control system as claimed in claim 13, wherein when the vehicle speed detected by said vehicle speed sensor means falls between said first predetermined value and a third predetermined value smaller than said second predetermined value, the rotational speed ratio between said input and output members is detected on the basis of the second smallest one of gear ratios which are provided by the combination of said gear trains detected by said shift position sensor means.

16. A control system as claimed in claim 14 or 15, wherein said third predetermined value of the vehicle speed is set to a value dependent on the combination of said gear trains detected by said shift position sensor means.

17. A control system as claimed in claim 6, including shift position sensor means for detecting a combination of said gear trains selected by said selector limit values of the rotational speed ratio are each set to a value dependent on the combination of said gear trains detected by said shift position sensor means.

18. A control system as claimed in claim 17, wherein when the vehicle speed detected by said vehicle speed sensor means falls between said second predetermined value and a third predetermined value larger than said first predetermined value, said predetermined upper and lower limit values of the rotational speed ratio are each set on the basis of the smallest one of gear ratios which are provided by the combination of said gear trains detected by said shift position sensor means.

19. A control system as claimed in claim 17, wherein the vehicle speed detected by said vehicle speed sensor means falls between said first predetermined value and a third predetermined value smaller than said second predetermined value, said predetermined upper and lower limit values of the rotational speed ratio are each set on the basis of the second smallest one of gear ratios which are provided by the combination of said gear trains detected by said shift position sensor means.

20. A control system as claimed in claim 6, wherein said range of the rotational speed ratio determined by said predetermined upper and lower limit values is shifted to a second range when the rotational speed ratio detected by said rotational speed ratio sensor means remains within said first-mentioned range for a predetermined period of time.

21. A control system as claimed in claim 20, wherein said second range is determined by second predetermined upper and lower limit values which are larger, respectively, than said predetermined upper and lower limit values determining said first-mentioned range.

22. A control system as claimed in claim 21, wherein when the rotational speed ratio detected by said rotational speed ratio sensor remains within said second range for a second predetermined period of time larger than said first-mentioned predetermined period of time, the rotational speed ratio is controlled so as to fall within said first-mentioned range in lieu of said second range.

23. A control system as claimed in any one of claims 20–22, including shift position sensor means for detecting a combination of said gear trains selected by said selector means, and wherein said shifting of said first-mentioned range of the rotational speed ratio to said second range is effected when the vehicle speed detected by said vehicle speed sensor means falls between said second predetermined value and a third predetermined value larger than said first predetermined value, and at the same time the combination of said gear trains detected by said shift position sensor means is a predetermined combination.

24. A control system as claimed in claim 6, including change rate sensor means for detecting the rate of change in the rotational speed ratio between said input and output members relative to the lapse of time, and wherein said control means is adapted to cause said operating fluid pressure regulating means to decrease the operating fluid pressure so that said direct-coupling mechanism applies said second engaging force to said input and output members, irrespective of the detected value of the rotational speed ratio between said input and output members, when the rate of change in the rotational speed ratio relative to the lapse of time detected by said change rate sensor means is larger than a predetermined reference value.

25. A control system as claimed in claim 24, wherein said decreasing of the operating fluid pressure by said control means is continued for a predetermined period of time.

26. A control system as claimed in claim 24, including shift position sensor means for detecting a combination of said gear trains selected by said selector means, and engine rotational speed sensor means for detecting the roational speed of said engine, and wherein said change rate sensor means is adapted to detect the rate of change in the rotational speed ratio between said input and output members with respect to the lapse of time on the basis of the vehicle speed detected by said vehicle speed sensor means, the smallest one of gear ratios which are provided by the combination of said gear trains detected by said shift position sensor means, and the rotational speed of said engine detected by said engine rotational speed sensor means.

27. A control system as claimed in claim 24, including shift position sensor means for detecting a combination of said gear trains selected by said selector means, and wherein said predetermined reference value of the rate of change in the rotational speed ratio is set to a value dependent on the combination of said gear trains detected by said shift position sensor means.

28. A control system as claimed in claim 6, wherein said operating fluid pressure regulating means includes pilot pressure generating means for generating a pilot pressure dependent at least on the value of a parameter indicative of the loaded condition of said engine, and fluid pressure modulating means for generating a fluid pressure proportional to the pilot pressure generated by said pilot pressure generating means and applying same as said operating fluid pressure to said hydraulically operating portion of said direct-coupling mechanism, said control system including pressure reducing means for reducing the pilot pressure generated by said pilot pressure generating means.

29. A control system as claimed in claim 28, wherein said vehicle is equipped with at least one load-creating equipment which applies a load on said engine when operated, said control system including operation sensor means for detecting the operative state of said load-creating equipment to determine the load on said engine therefrom, said control means being adapted to cause said pressure reducing means to decrease the pilot pressure irrespective of the detected value of the rotational speed ratio between said input and output members, when the load determined from the operative tate of said load-creating equipment determined by said operation sensor meansis larger than a predetermined value.

30. A control system as claimed in claim 29, wherein said engine has an intake passage and a throttle valve arranged in said intake passage, said parameter indicative of the loaded condition of said engine being the valve opening of said throttle valve.

31. A control system as claimed in claim 30, wherein said pressure reducing means decreases the pilot pressure by an amount corresponding to a predetermined valve opening of said throttle valve, when the load determined from the operative state of said load-creating equipment determined by said operation sensor means is larger than said predetermined value.

32. A control system as claimed in claim 1, wherein said control means causes said operating fluid pressure regulating means to increase the operating fluid pressure so that said direct-coupling mechanism applies said first engaging force to said input and output members, irrespective of said parameter indicative of an amount of relative slip between said input and output members, when the vehicle speed detected by said vehicle speed sensor means is larger than said second predetermined value.

* * * * *